United States Patent
Zhao et al.

(10) Patent No.: US 9,130,482 B2
(45) Date of Patent: Sep. 8, 2015

(54) PSEUDO ZERO VECTORS FOR SPACE VECTOR MODULATION AND ENHANCED SPACE VECTOR MODULATION

(71) Applicant: Infineon Technologies AG, Neubiberg (DE)

(72) Inventors: Tao Zhao, Singapore (SI); Arno Rabenstein, Singapore (SI); Theng Kiong Gan, Singapore (SI); Choon Keat Kok, Singapore (SI); Sze Main Wong, Singapore (SI)

(73) Assignee: Infineon Technologies AG, Neubiberg (DE)

( * ) Notice: Subject to any disclaimer, the term of this patent is extended or adjusted under 35 U.S.C. 154(b) by 30 days.

(21) Appl. No.: 14/012,083

(22) Filed: Aug. 28, 2013

(65) Prior Publication Data

US 2014/0233289 A1 Aug. 21, 2014

Related U.S. Application Data

(60) Provisional application No. 61/766,858, filed on Feb. 20, 2013.

(51) Int. Cl.
*H02M 7/5395* (2006.01)
*H02M 7/5387* (2007.01)

(52) U.S. Cl.
CPC ........ *H02M 7/5395* (2013.01); *H02M 7/53875* (2013.01); *H02M 2007/53876* (2013.01)

(58) Field of Classification Search
CPC ........................ H02M 7/5395; H02M 7/53875
USPC ................................................. 363/131, 132
See application file for complete search history.

(56) References Cited

U.S. PATENT DOCUMENTS

| 6,490,185 B1 * | 12/2002 | Yamanaka et al. .............. 363/98 |
| 2007/0103950 A1 * | 5/2007 | Arisawa et al. ............... 363/132 |

(Continued)

FOREIGN PATENT DOCUMENTS

| JP | 2005-012934 | 1/2005 |
| JP | 2005-020816 | 1/2005 |
| JP | 2006-246649 | 9/2006 |
| WO | 2006022142 | 3/2006 |

OTHER PUBLICATIONS

Jian Sun, Horst Grotstollen, "Optimized Space Vector Modulation and Regular-Sampled PWM: A Reexamination", IEEE 1996.

(Continued)

*Primary Examiner* — Emily P Pham
(74) *Attorney, Agent, or Firm* — Eschweiler & Associates, LLC

(57) ABSTRACT

A method of performing space vector modulation for PWM control for creating AC waveforms includes generating and sampling a reference signal to generate reference samples and performing a reference vector approximation to synthesize a reference vector associated with at least one of the reference samples. The reference vector approximation employs active vectors, one or more zero vectors, and one or more pseudo zero vectors in the formation thereof. Another method of performing space vector modulation (SVM) includes generating a reference signal and sampling the reference signal at a sampling frequency to generate a plurality of reference samples. The method also includes performing a reference vector approximation to synthesize a reference vector associated with at least one of the reference samples, wherein the reference vector approximation has a first portion that employs two adjacent active vectors and a remaining portion that employs two non-adjacent active vectors in the formation thereof.

10 Claims, 31 Drawing Sheets

(56) References Cited

U.S. PATENT DOCUMENTS

2010/0165674 A1    7/2010  Dai et al.
2013/0336023 A1*  12/2013  Yamanaka .................... 363/37
2014/0233262 A1    8/2014  Zhao et al.

OTHER PUBLICATIONS

Non Final Office Action Dated May 6, 2015 U.S. Appl. No. 14/011,867.

* cited by examiner

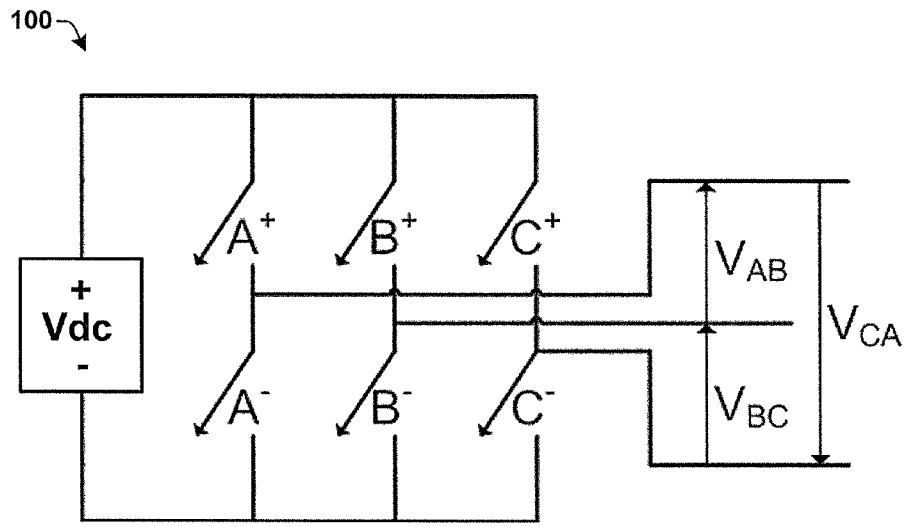

Fig. 1

(PRIOR ART)

| vector | A⁺ | B⁺ | C⁺ | A⁻ | B⁻ | C⁻ | $V_{AB}$ | $V_{BC}$ | $V_{CA}$ | |
|---|---|---|---|---|---|---|---|---|---|---|
| $V_0$=[000] | OFF | OFF | OFF | ON | ON | ON | 0 | 0 | 0 | Zero vector |
| $V_1$=[100] | ON | OFF | OFF | OFF | ON | ON | +$V_{dc}$ | 0 | -$V_{dc}$ | Active vector |
| $V_2$=[110] | ON | ON | OFF | OFF | OFF | ON | 0 | +$V_{dc}$ | -$V_{dc}$ | Active vector |
| $V_3$=[010] | OFF | ON | OFF | ON | OFF | ON | -$V_{dc}$ | +$V_{dc}$ | 0 | Active vector |
| $V_4$=[011] | OFF | ON | ON | ON | OFF | OFF | -$V_{dc}$ | 0 | +$V_{dc}$ | Active vector |
| $V_5$=[001] | OFF | OFF | ON | ON | ON | OFF | 0 | -$V_{dc}$ | +$V_{dc}$ | Active vector |
| $V_6$=[101] | ON | OFF | ON | OFF | ON | OFF | +$V_{dc}$ | -$V_{dc}$ | 0 | Active vector |
| $V_7$=[111] | ON | ON | ON | OFF | OFF | OFF | 0 | 0 | 0 | Zero vector |

Fig. 2

(PRIOR ART)

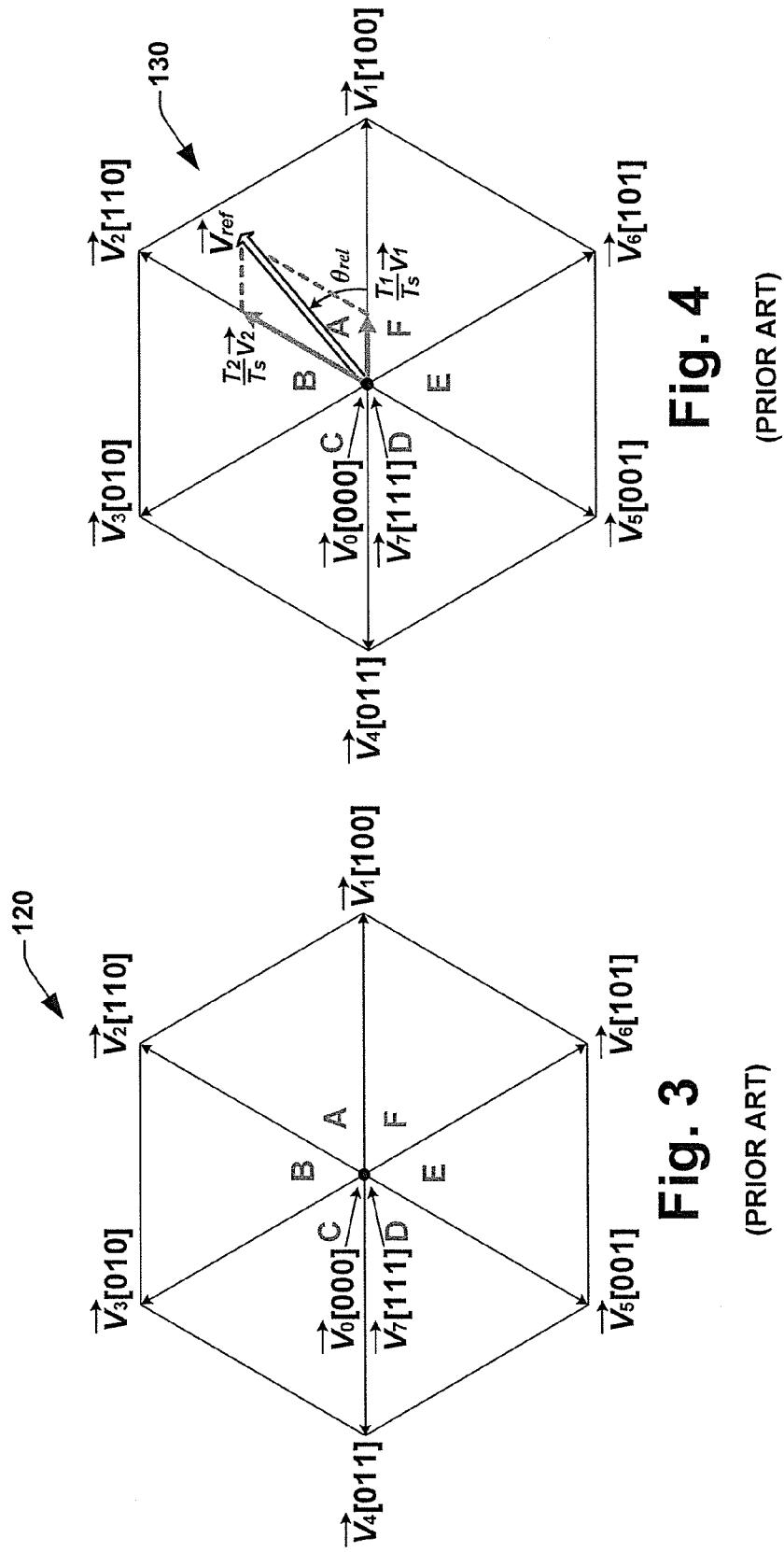

Normalized time $T_1/N$ and $T_2/N$ (where $N = KT_S$) versus reference vector angle θ for existing SVM

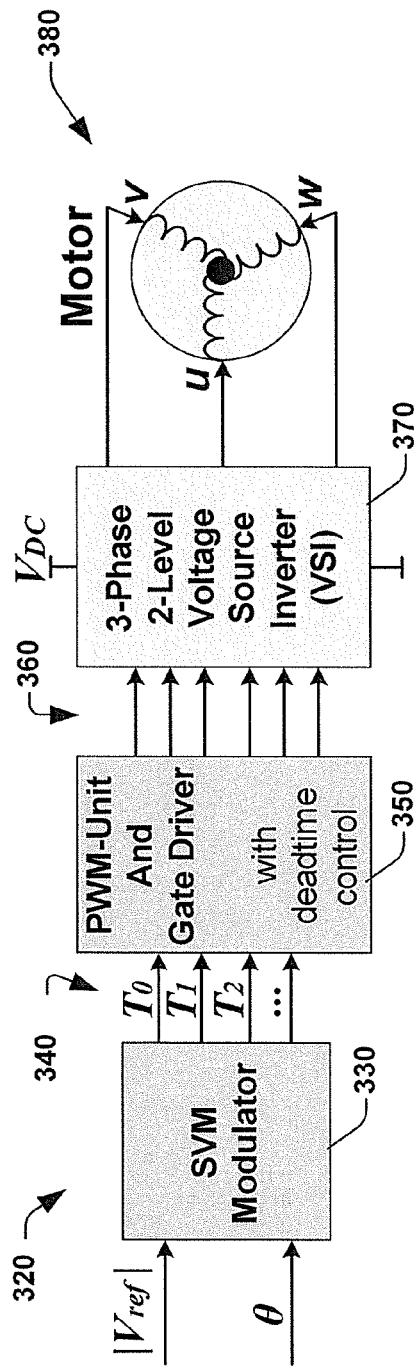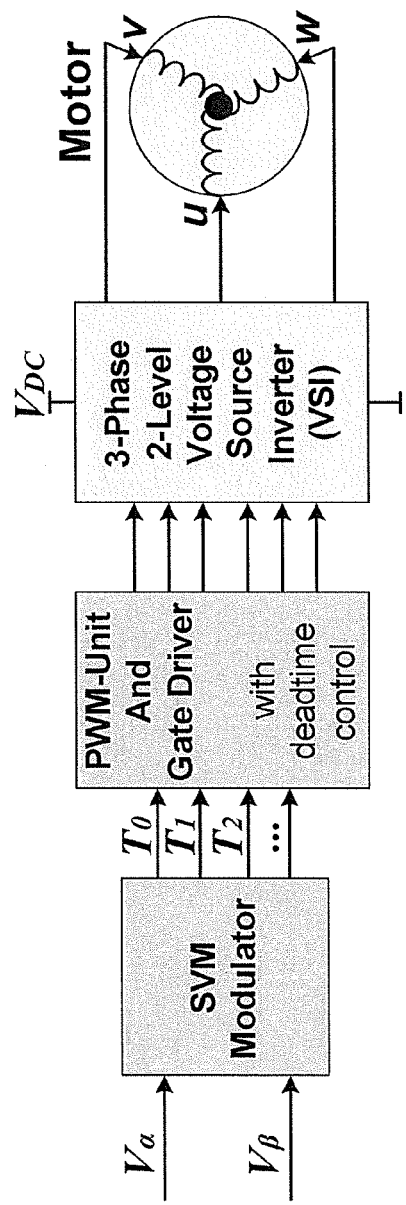
Fig. 13A
Fig. 13B

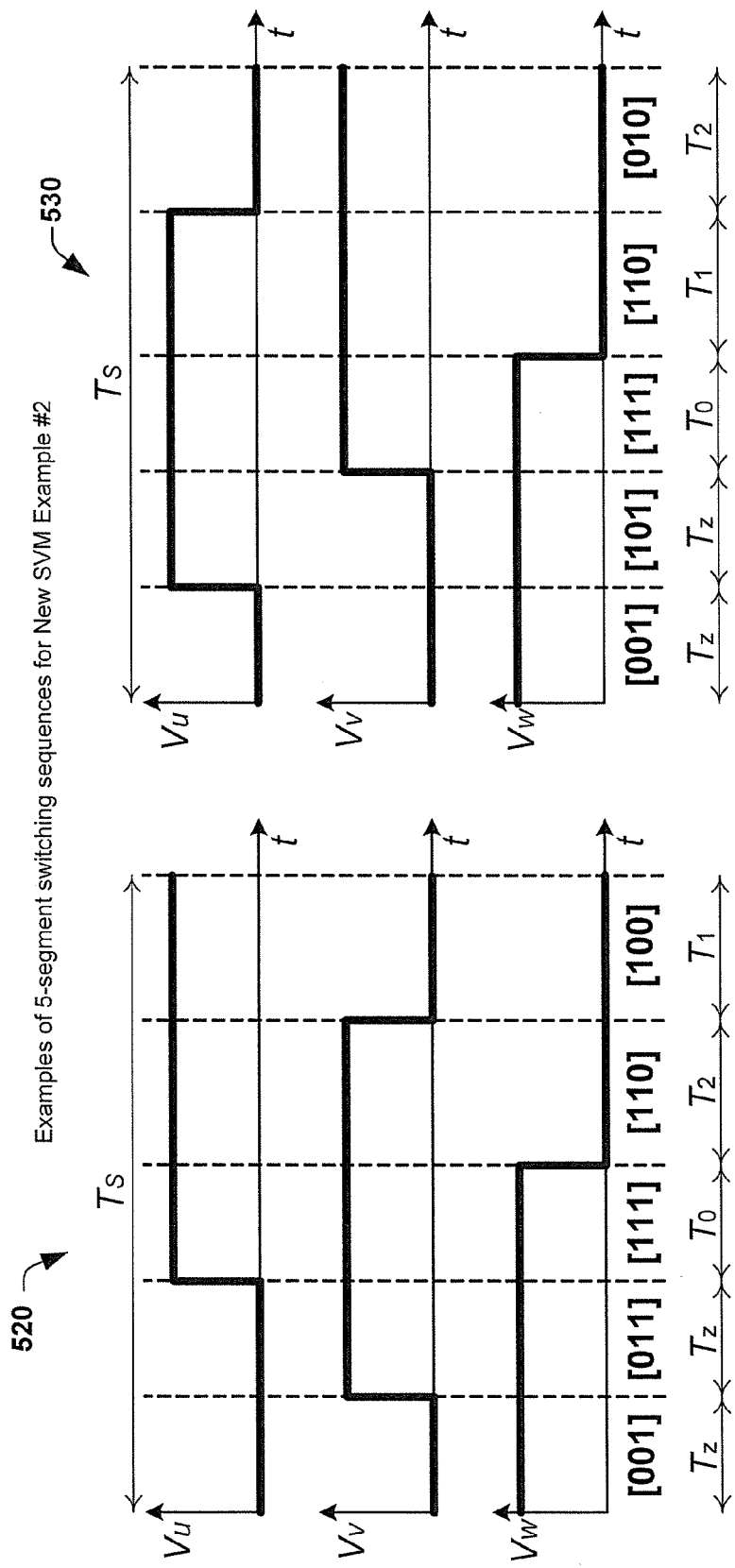

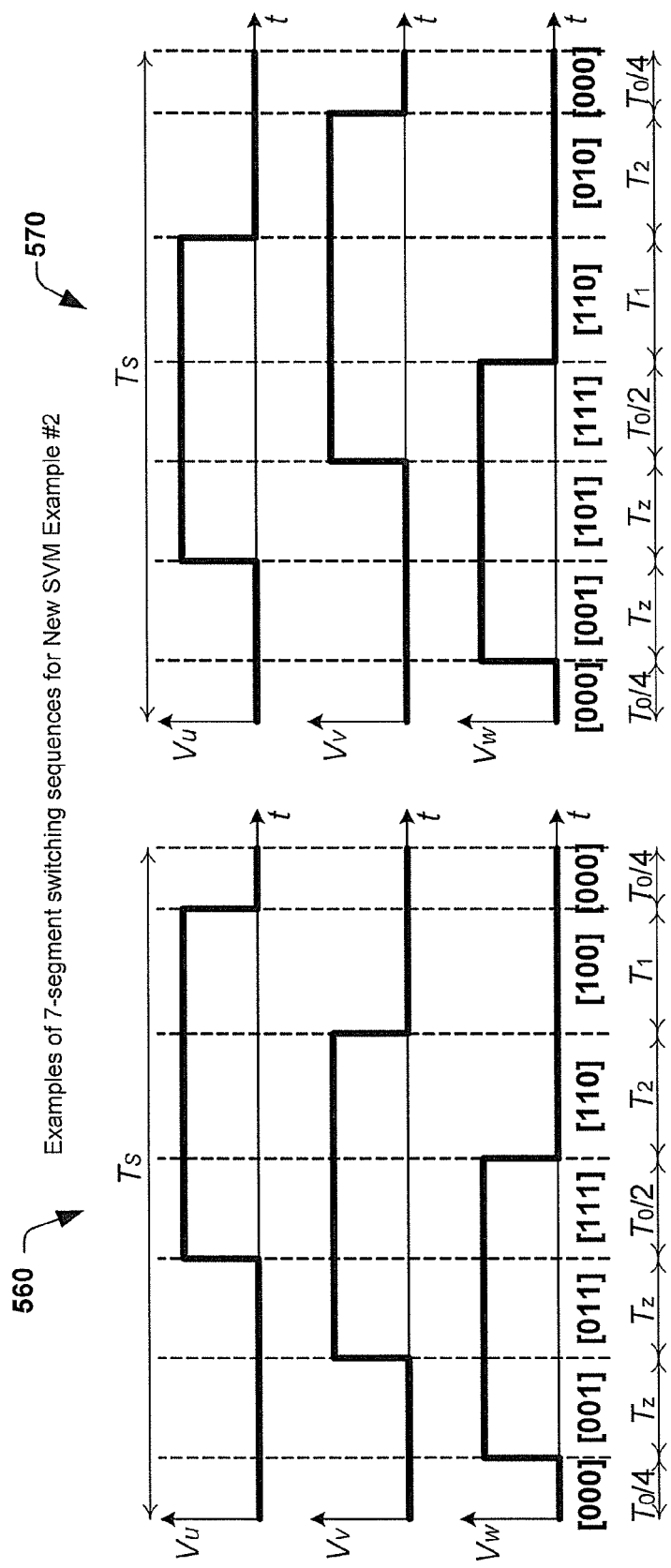

Approximations of reference vector (in sector A as examples) in enhanced SVM

Three-phase two-level voltage source inverter with single-shunt current sensing

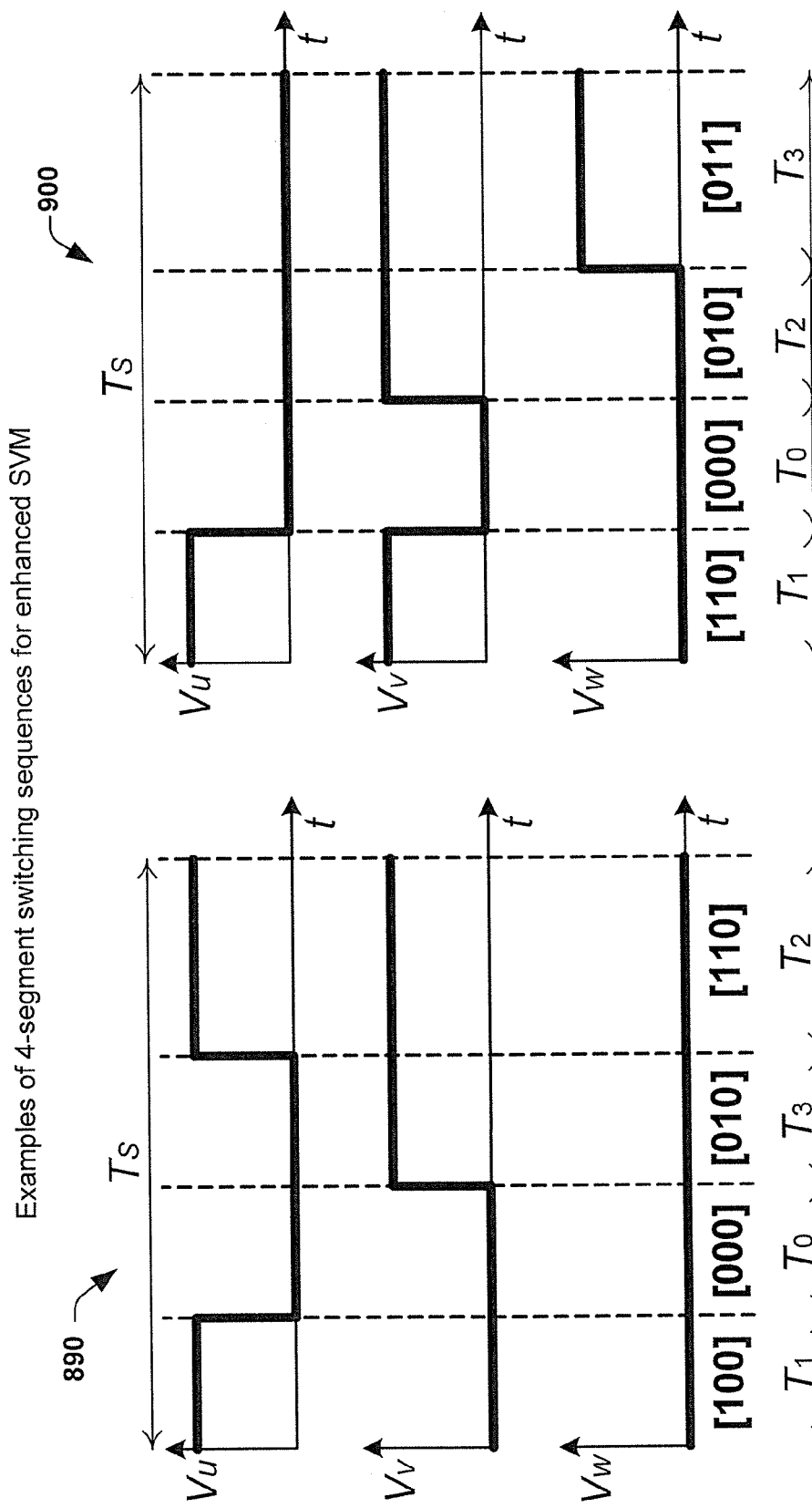

Examples of 5-segment switching sequences for enhanced SVM at m = 0

PSEUDO ZERO VECTORS FOR SPACE VECTOR MODULATION AND ENHANCED SPACE VECTOR MODULATION

FIELD

The present disclosure relates to an apparatus and method for performing space vector modulation for PWM control for creating AC waveforms using pseudo zero vectors or enhanced space vector modulation, or both, for example, in motor control applications.

BACKGROUND

Space vector modulation (SVM) is an algorithm for the control of pulse width modulation (PWM). It is used for the creation of alternating current (AC) waveforms; most commonly to drive three-phase AC powered motors at varying speeds from DC. There are numerous variations of SVM that result in different quality and computational requirements.

A three phase inverter 100 as shown in FIG. 1 must be controlled so that at no time are both switches in the same leg turned on or else the DC supply would be shorted. This requirement may be met by the complementary operation of the switches within a leg. That is, if $A^+$ is on, then $A^-$ is off, and vice versa. This leads to eight possible switching vectors for the inverter 100, $V_0$ through $V_7$ with six active switching vectors and two zero vectors, as illustrated in the chart 110 of FIG. 2.

To implement space vector modulation a reference signal $V_{ref}$ is sampled with a frequency $f_s$ ($T_s=1/f_s$). The reference signal may be generated from three separate phase references using the αβγ transform, for example. The reference vector is then synthesized using a combination of the two adjacent active switching vectors and one or both of the zero vectors. Various strategies of selecting the order of the vectors and which zero vector(s) to use exist. Strategic selection of the vectors will affect the harmonic content and the switching losses.

SUMMARY

The present disclosure is directed to a method of performing space vector modulation for PWM control for creating AC waveforms. The method includes generating and sampling a reference signal to generate reference samples and performing a reference vector approximation to synthesize a reference vector associated with at least one of the reference samples. The reference vector approximation employs active vectors, one or more zero vectors, and one or more pseudo zero vectors in the formation thereof.

In one embodiment of the method, the pseudo vector comprises a combination of two active vectors that have an angle difference therebetween of 180°. In another embodiment, the two active vectors that in combination form the pseudo vector have a scalar amplitude that is the same.

In another embodiment of the method, the pseudo vector comprises a combination of three active vectors that have an angle difference therebetween of 120°. In still another embodiment, the three active vectors that in combination form the pseudo vector have a scalar amplitude that is the same.

In one embodiment of the method, the active vectors in the reference vector approximation comprise adjacent active vectors. In another embodiment, a portion of the reference vector is approximated by two adjacent active vectors, and a remaining portion of the reference vector is approximated by two non-adjacent active vectors. In accordance with one embodiment, the portion of the reference vector driven by active vectors is represented by a variable m, wherein 0≤m≤1, and the remaining portion of the reference vector driven by active vectors is represented by 1−m. When m=1, the entire reference vector driven by active vectors is approximated by two adjacent vectors, and when m=0 the entire reference vector driven by active vectors is approximated by two non-adjacent active vectors. In one embodiment, the non-adjacent active vectors are separated from one another by 120°.

In accordance with another embodiment of the disclosure, a control system comprises a space vector modulator configured to receive a plurality of reference signal samples and perform a reference vector approximation to synthesize a reference vector associated with at least one of the reference signal samples. The reference vector approximation employs active vectors, one or more zero vectors, and one or more pseudo zero vectors in the formation thereof, wherein the space vector modulator outputs timing signals based on the reference vector approximation. The control system further comprises a pulse width modulation unit configured to receive the timing signals from the space vector modulator, and output pulse width modulation control signals based thereon, and a three phase inverter configured to receive the pulse width modulation control signals and generate alternating current waveforms based thereon.

In one embodiment of the control system a pseudo vector comprises a combination of two active vectors that have an angle difference therebetween of 180°. In another embodiment, the two active vectors that in combination form the pseudo vector have a scalar amplitude that is the same.

In another embodiment of the control system a pseudo vector comprises a combination of three active vectors that have an angle difference therebetween of 120°. In still another embodiment, the three active vectors that in combination form the pseudo vector have a scalar amplitude that is the same.

In one embodiment of the control system the active vectors in the reference vector approximation comprise adjacent active vectors. In another embodiment, a portion of the reference vector is approximated by two adjacent active vectors, and a remaining portion of the reference vector is approximated by two non-adjacent active vectors. In one embodiment, the portion of the reference vector is represented by a variable m, wherein 0≤m≤1, wherein the remaining portion of the reference vector is represented by 1−m. When m=1 the entire reference vector driven by active vectors is approximated by two adjacent active vectors, and when m=0 the entire reference vector driven by active vectors is approximated by two non-adjacent active vectors. In one embodiment, the non-adjacent vectors are separated from one another by 120°.

In one embodiment of the control system the three phase inverter comprises a first series-connected switch pair connected together at a node that forms a first phase output, a second series-connected switch pair connected together at a node that forms a second phase output, and a third series-connected switch pair connected together at a node that forms a third phase output. The inverter further comprises a shunt resistor connected with a first terminal to a bottom node of each of the first, second and third series-connected switch pairs, and a second terminal coupled to a reference potential, and an amplifier having first and second inputs coupled to the first and second terminals of the shunt resistor, respectively, wherein an output of the amplifier reflects a current level conducting through the shunt resistor.

BRIEF DESCRIPTION OF THE DRAWINGS

Example embodiments according to the disclosure will be explained in more detail in the following text with reference to the attached figures, in which:

FIG. 1 is a schematic diagram of a three phase inverter for generating AC waveforms;

FIG. 2 is a chart illustrating various vectors for switching the switches of the three phase inverter of FIG. 1;

FIG. 3 is hexagon diagram illustrating the basic voltage space vectors from the chart of FIG. 2;

FIG. 4 is a hexagon diagram illustrating a reference vector approximation in accordance with conventional techniques;

FIGS. 6A-6E are hexagon diagrams illustrating a basic pseudo zero vector, wherein FIGS. 6A-6C show a combination of two active vectors, and FIGS. 6D-6E show a combination of three active vectors;

FIGS. 13A-13B are block diagrams illustrating a control system, such as a motor control system, that employs a space vector modulator that employs pseudo zero vectors in approximating reference vectors according to one embodiment of the disclosure;

FIGS. 17A-17B illustrate examples of 5-segment switching sequences for the example of FIG. 8;

FIGS. 19A-19B illustrate examples of 7-segment switching sequences for the example of FIG. 8;

FIGS. 30A-30B illustrate examples of 4-segment switching sequences for enhanced SVM according to one embodiment;

FIGS. 35A-35B are space vector hexagons illustrating special cases of enhanced SVM, wherein FIG. 35A illustrates the case of m≥1, and FIG. 35B illustrates the case of m≤0, wherein four active vectors are employed to approximate the reference vector, wherein FIG. 35A shows adjacent active vectors and FIG. 35B shows non-adjacent active vectors.

DETAILED DESCRIPTION

Figure 5:
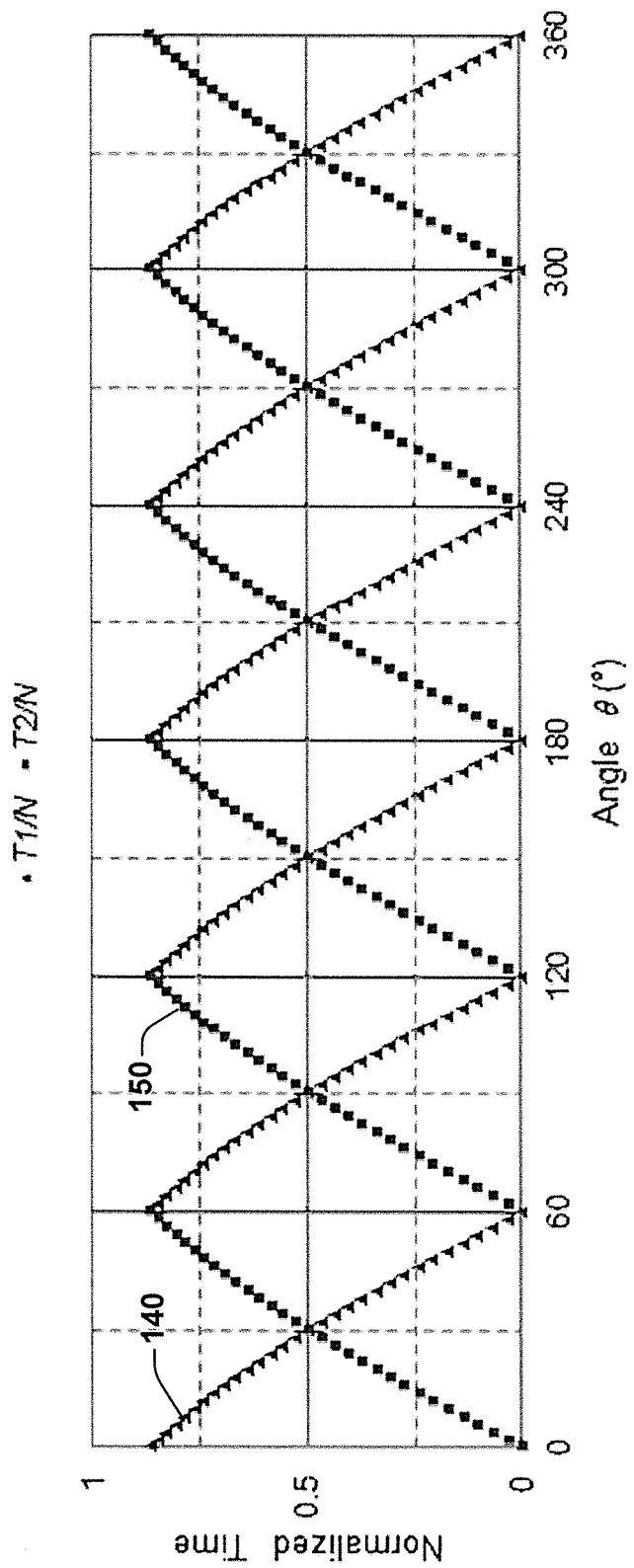
FIG. 5 is a graph illustrating normalized time versus reference vector angle for conventional space vector modulation (SVM)

In some cases, the same reference symbols are used in the following text for objects and functional units that have the same or similar functional characteristics. Furthermore, optional features of the various example embodiments can be combined with one another or replaced by one another.

For industry and automotive motor control applications, SVM is ubiquitously used in the sinusoidal commutation control (such as V/f, FOC (field oriented control), and DTC (direct torque control)) of PMSM (permanent magnet synchronous motor) and ACIM (alternating current induction motor) to generate sine waveforms from three-phase inverters. Sinusoidal commutation motor control with a single-shunt current sensing resistor inserted in the inverter DC link is a desirable solution when compared to dual-shunt and triple-shunt current sensing techniques, owing to its important advantages such as low cost, simplicity and etc. However, two current samples within one pulse width modulation (PWM) cycle are needed for correct motor phase current reconstruction with single-shunt current sensing. However, with conventional SVM techniques, the accurate current construction is difficult in the following situations: (1) The reference voltage space vector is crossing a sector border as only one current sample can be measured (this occurs in many instances) and (2) When the modulation index is low and the sampling intervals are too short, none of the current samples can be taken (this normally happens in ultra-low speed motor control).

The present disclosure proposes a new concept of a pseudo zero vector (alternatively this may be called a quasi zero vector, or a synthetic zero vector) to SVM to address the above-mentioned problems. With the new SVM using pseudo zero vectors, one is able to provide low-cost, high-quality, more reliable, and unique motor control solutions (e.g., sensorless FOC with single-shunt current sensing) to customers. The new SVM with pseudo zero vectors may also be used in three-phase power inverter control for uninterruptible power supplies, renewable energy, and etc.

The space vector diagram (a regular hexagon) 120 and reference vector approximation 130 of the existing conventional SVM are shown in FIGS. 3 and 4, respectively. $\vec{V}_1$ to $\vec{V}_6$ are active vectors. $\vec{V}_0$ and $\vec{V}_7$ do not generate any voltage difference in the inverter outputs and are the only two zero vectors (or passive vectors) in existing SVM. The revolving reference vector $\vec{V}_{ref} = |V_{ref}| \cdot e^{j\theta}$ is approximated by two adjacent active vectors (e.g., $\vec{V}_1$, $\vec{V}_2$ in sector A) and one or both of the existing zero vectors (e.g., $\vec{V}_0$ only). The plane of the space vector hexagon is dissected in six sectors from A to F and the angle $\theta$ of $\vec{V}_{ref}$ is transformed into the relative angle $\theta_{rel}$, in each sector. Using reference vector in sector A as an example, the following portion shows the calculations of existing or conventional SVM.

Using volt-second balancing:

$$\vec{V}_{ref} = \frac{T_0}{T_S} \vec{V}_0 + \frac{T_1}{T_S} \vec{V}_1 + \frac{T_2}{T_S} \vec{V}_2 \quad (1)$$

$$T_S = T_0 + T_1 + T_2 \quad (2)$$

Solving the Equations (1) and (2), one obtains:

$$T_1 = K \sin(60° - \theta_{rel}) \cdot T_S \quad (3)$$

$$T_2 = K \sin(\theta_{rel}) \cdot T_S \quad (4)$$

Adding the Equations (3) and (4), one obtains:

$$T_1 + T_2 = K \sin(60° + \theta_{rel}) \cdot T_S \quad (5)$$

So the zero vector time is:

$$T_0 = T_S - (T_1 + T_2) = [1 - K \sin(60° + \theta_{rel})] \cdot T_S \quad (6)$$

where:

$T_0$—Time of the zero vector(s) is/are applied. The zero vector(s) can be $\vec{V}_0$ [000], or $\vec{V}_7$ [111], or both $T_1$—Time of the 1$^{st}$ active vector (e.g., $\vec{V}_1$ in sector A) is applied within one sampling period, $T_2$—Time of the 2$^{nd}$ active vector (e.g., $\vec{V}_2$ in sector A) is applied within one sampling period, $K$—

$$K = \sqrt{3} \cdot \frac{|V_{ref}|}{V_{DC}}.$$

$|\vec{V}_{ref}|$ is the amplitude of $\vec{V}_{ref}$, and $V_{DC}$ is the inverter DC link voltage, $T_S$—Sampling period, e.g., $T_S = 50$ μs As $T_0 \geq 0$ (or $T_1 + T_2 \leq T_S$) all the time, so $K \leq 1$. We have inverter DC link voltage utilization without over-modulation:

$$\eta = \frac{|V_{ref}|}{V_{DC}} \leq \frac{1}{\sqrt{3}} \quad (7)$$

Plots of normalized time $T_1$ 140 and $T_2$ 150 of Equations (3) and (4) are shown in FIG. 5. It is obvious that either $T_1$ or $T_2$ is close or equal to zero at the border of each sector (e.g., near $\theta = 0°$ or $60°$ in sector A), which is the root cause of the above-mentioned problem (1) for motor control with SVM and single-shunt current sensing. There have been numerous prior attempts to solve this problem, but each solution has its disadvantages.

For example, motor phase current construction from DC link current via a single-shunt resistor is done by limiting $T_1$ and $T_2$ with a time $T_{min}$ (which is PWM dead time+driver delay+ADC sampling time) for ADC to sample the correct current values. However, limiting $T_1$ and $T_2$ will generate a distorted voltage vector, and therefore result in high torque ripple, high vibration & acoustic noise, and even unstable motor control with high dynamic loads. A very fast ADC is required to optimize the system performance in such instances.

Another conventional solution is modifying the SVM switching pattern to a minimum measurement time window in order to allow two current samples to be taken. This pattern modification could generate some current ripple; moreover, more CPU resources are needed to implement the algorithm due to modification of patterns and correction of the same modifications.

Another conventional solution employs use of asymmetrical PWM pulses (with two PWM pulses shifted to obtain enough time for current sampling while duty cycles for all the PWM pulses preserved) only partly solves the problem. It can be found that both $T_1$ and $T_2$ are close or equal to zero if K is very small or K=0, which causes the problem (2) mentioned above. Using the asymmetrical PWM pulses just mentioned can only partly solve this problem.

The present disclosure proposes a new concept of a pseudo zero vector to SVM, with which the approximation of the reference vector with more than two active vectors becomes relatively easy and straightforward. (In contrast, existing SVM uses only two adjacent active vectors to approximate the reference vector). The pseudo zero vectors shown in FIGS. 6A-6E complement the existing two zero vectors and expand the SVM theory, giving more choice of zero vectors in the approximation of the reference vector.

Figure 6A:
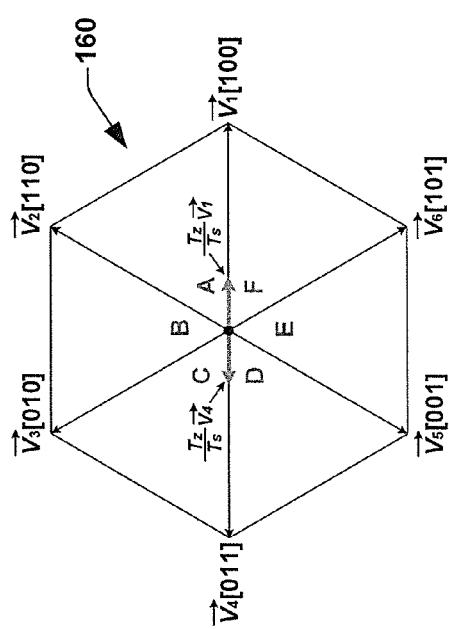
Figure 6B:
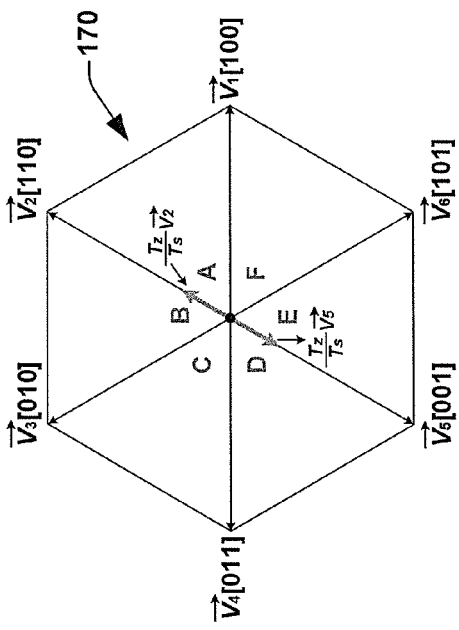
Figure 6C:
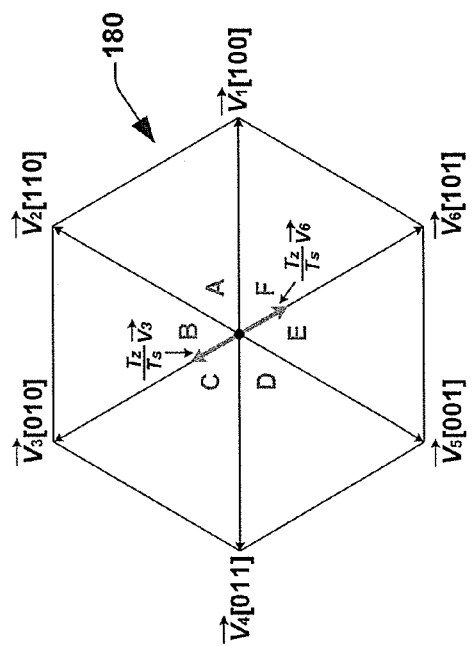
Figure 6E:
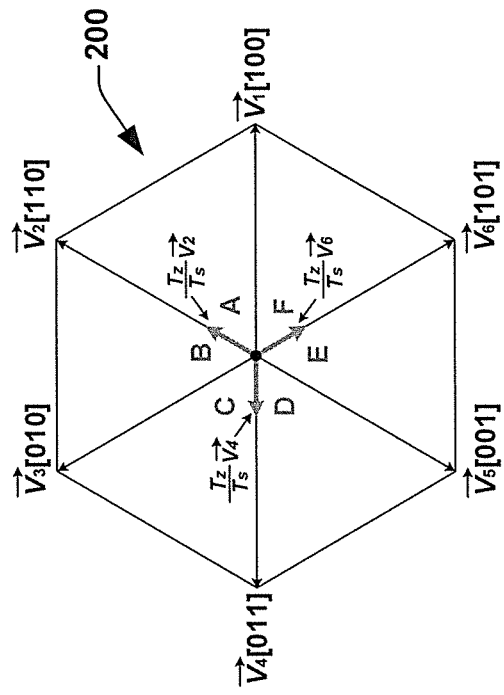
Figure 6D:
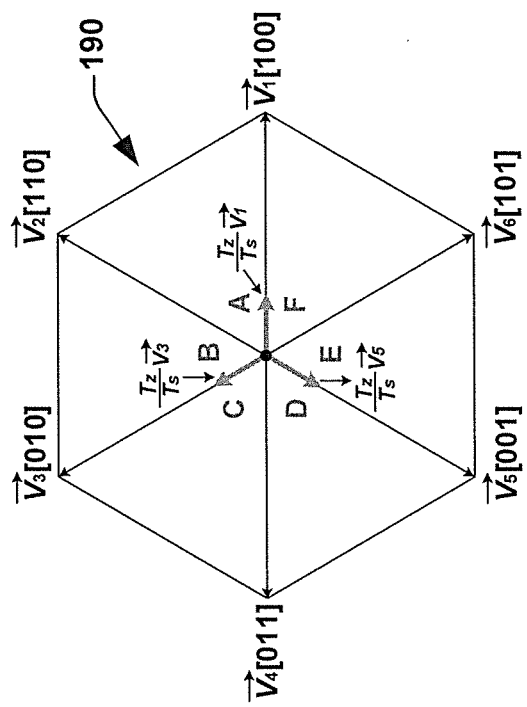

A basic pseudo zero vector is either a combination of two active vectors 160, 170, or 180 as shown in FIGS. 6A, 6B and 6C, or a combination of three active vectors 190 or 200 as shown in FIGS. 6D and 6E. The pseudo zero vector time $T_z$ shown in FIGS. 6A-6E can be time-variant, θ-angle-dependent, or constant, depending on the different application requirements. These pseudo zero vectors have similar effects of existing zero vectors (i.e., they do not generate any voltage difference in the inverter outputs). Any combinations of the pseudo zero vectors also give the same effects. The pseudo zero vectors can be used in similar ways as the existing zero vectors are used (i.e., one, two, or a combination of zero vectors being used in the approximation of a reference vector).

The advantages of the new concept of a pseudo zero vector according to the present disclosure are that there are many more choices of "zero vectors" in the SVM approximation. The approximation of the reference vector with more than two active vectors becomes very easy and convenient. Additionally, the corresponding calculations are similar to those of the existing SVM, and thus are relatively simple and fast.

Two SVM examples according to the present disclosure are provided below with selective utilization of the pseudo zero vectors. Both new SVM examples have non-zero time intervals for two single-shunt current samplings within any PWM cycle, and hence can easily solve the above-mentioned problem (1). Further, and advantageously, new SVM Example #2 can completely solve problem (2) mentioned above.

In the new SVM examples, engineers can tune the pseudo zero vector time $T_z$ to obtain different current sampling intervals based on different system requirements and hardware designs, so as to achieve the best performance of motor control with single-shunt current sensing. Particularly, as the long ADC sampling intervals can be obtained easily by selecting longer pseudo zero vector time $T_z$, it is also possible to use a low-speed, common and low-cost operational amplifier (if any) for DC link current signal amplification to further lower the system cost.

Table 1 summarizes the basic voltage space vectors for the SVM with the new concept of a pseudo zero vector.

TABLE 1

Basic voltage space vectors of SVM with new concept of pseudo zero vector

| Basic Voltage Space Vector | | Remark |
|---|---|---|
| Active Vectors | $\vec{V}_1 [100]$ $\vec{V}_2 [110]$ $\vec{V}_3 [010]$ $\vec{V}_4 [011]$ $\vec{V}_5 [001]$ $\vec{V}_6 [101]$ | These are all the eight basic voltage space vectors of existing SVM. |
| Existing Zero Vectors | $\vec{V}_0 [000]$ $\vec{V}_7 [111]$ | |
| Pseudo Zero Vectors | $\frac{T_z}{T_S}\vec{V}_1 + \frac{T_z}{T_S}\vec{V}_4$ $\frac{T_z}{T_S}\vec{V}_2 + \frac{T_z}{T_S}\vec{V}_5$ $\frac{T_z}{T_S}\vec{V}_3 + \frac{T_z}{T_S}\vec{V}_6$ $\frac{T_z}{T_S}\vec{V}_1 + \frac{T_z}{T_S}\vec{V}_3 + \frac{T_z}{T_S}\vec{V}_5$ | New concept for SVM. $T_z$ can be time-variant, θ-angle-dependent, or constant. |

TABLE 1-continued

Basic voltage space vectors of SVM with new concept of pseudo zero vector

| Basic Voltage Space Vector | Remark |
|---|---|
| $\frac{T_z}{T_S}\vec{V}_2 + \frac{T_z}{T_S}\vec{V}_4 + \frac{T_z}{T_S}\vec{V}_6$ | |

An element of the disclosure is the introduction of the new concept of a pseudo zero vector to SVM. With the new pseudo zero vectors, there are many more choices of zero vectors compared to the only two in existing or conventional SVM, which gives more flexibility for the approximation of the reference vector as well as the design of the SVM switching sequences. The approximation of a reference vector with more than two active vectors becomes relatively easy and convenient. In addition, the corresponding calculations are similar to that of existing SVM, and hence relatively simple and fast.

This section shows two examples of selective utilization of pseudo zero vectors in SVM to straightforwardly solve the single-shunt motor control problems that the existing SVM has difficulties in dealing with effectively.

New SVM Example #1

Figures 7A, 7B:
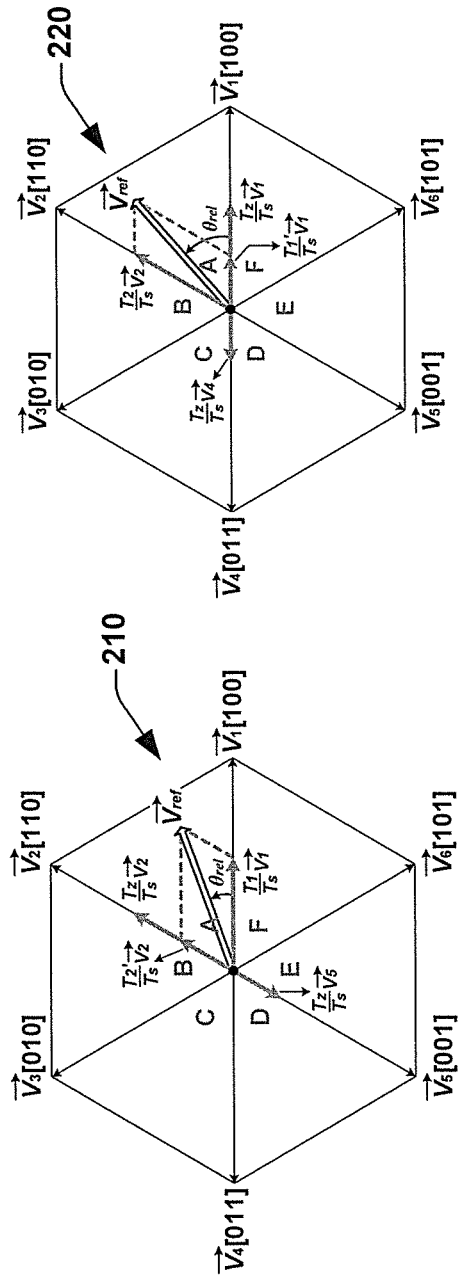
FIGS. 7A-7B show approximations of a reference vector using one pseudo zero vector, such as those illustrated in FIGS. 6A-6C according to one embodiment.

Using sector A as an example as shown in FIGS. 7A and 7B, the reference vector $\vec{V}_{ref}$ 210, 220 is approximated by two adjacent active vectors, one pseudo zero vector, and one or both of the existing zero vectors. Combining the time of the same active vectors (e.g:

$$\frac{T'_z}{T_S}\vec{V}_2 \text{ and } \frac{T_z}{T_S}\vec{V}_2$$

in FIG. 7A), $\vec{V}_{ref}$ is actually approximated by three active vectors (e.g., $\vec{V}_1$, $\vec{V}_2$ and $\vec{V}_4$ in FIG. 7B and $V_1$, $\vec{V}_2$ and $\vec{V}_5$ in FIG. 7A). This new SVM Example #1 is elaborated in greater detail below.

New SVM Example #2

Figure 8:
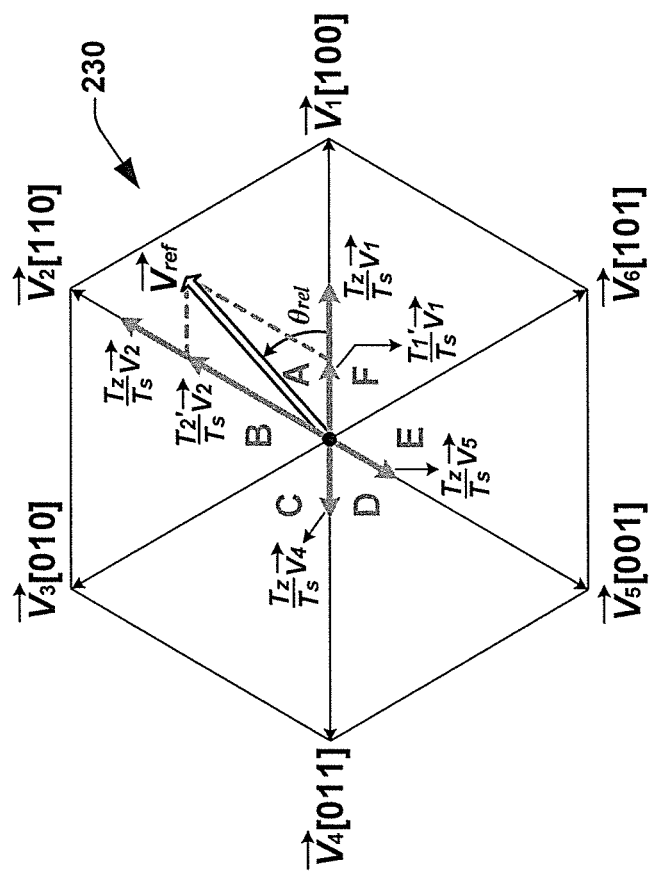
FIG. 8 shows an approximation of a reference vector using two pseudo zero vectors, such as those illustrated in FIGS. 6A-6C according to one embodiment.

Using sector A as an example as shown in FIG. 8, the reference vector $\vec{V}_{ref}$ 230 is approximated by two adjacent active vectors, two pseudo zero vectors, and one or both of the existing zero vectors. Combining the time of the same active vectors (i.e.:

$$\frac{T'_1}{T_S}\vec{V}_1 \text{ and } \frac{T_z}{T_S}\vec{V}_1, \frac{T'_2}{T_S}\vec{V}_2 \text{ and } \frac{T_z}{T_S}\vec{V}_2,\Big),$$

is actually approximated by four active vectors. The new SVM Example #2 is elaborated in greater detail below as well.

Table 2 compares and summarizes the existing SVM and the new SVM examples with pseudo zero vectors.

TABLE 2

Comparison of existing SVM and new SVM examples using pseudo zero vectors

| | | $\vec{V}_{ref}$ Angle | | | Active Vectors For $\vec{V}_{ref}$ Approximation | | | | |
|---|---|---|---|---|---|---|---|---|---|
| | | θ (limit 0° ≤ θ < 360°) | | | Note 1 | | | | |
| | Sector | Start | End | $\theta_{rel}$ | $1^{st}$ | $2^{nd}$ | $3^{rd}$ | $4^{th}$ | Formulas |
| Existing SVM | A | 0° | 60° | θ-0° | $\vec{V}_1$ | $\vec{V}_2$ | — | — | $T_1 = K\sin(60° - \theta_{rel}) \cdot T_S$ |
| | B | 60° | 120° | θ-60° | $\vec{V}_2$ | $\vec{V}_3$ | — | — | $T_2 = K\sin(\theta_{rel}) \cdot T_S$ |
| | C | 120° | 180° | θ-120° | $\vec{V}_3$ | $\vec{V}_4$ | — | — | $T_0 = T_S - (T_1 + T_2)$ |
| | D | 180° | 240° | θ-180° | $\vec{V}_4$ | $\vec{V}_5$ | — | — | where $K = \sqrt{3} \cdot \frac{|V_{ref}|}{V_{DC}}$ and |
| | E | 240° | 300° | θ-240° | $\vec{V}_5$ | $\vec{V}_6$ | — | — | |
| | F | 300° | 360° | θ-300° | $\vec{V}_6$ | $\vec{V}_1$ | — | — | $\frac{|V_{ref}|}{V_{DC}} \leq \frac{1}{\sqrt{3}}$ |
| New SVM Example #1 | A1 | 0° | $\Theta_{Tr}$ Note 2 | θ-0° | $\vec{V}_1$ | $\vec{V}_2$ | $\vec{V}_5$ | — | 1). For $0° \leq \theta_{rel} < \Theta_{Tr}$: $T_1 = K\sin(60° - \theta_{rel}) \cdot T_S$ |
| | A2 | $\Theta_{Tr}$ | 60° | θ-0° | $\vec{V}_1$ | $\vec{V}_2$ | $\vec{V}_4$ | — | $T_2 = [K\sin(\theta_{rel}) + \lambda] \cdot T_S$ |
| | B1 | 60° | $60° + \Theta_{Tr}$ | θ-60° | | | | | 2). For $\Theta_{Tr} \leq \theta_{rel} < 60°$: |
| | B2 | $60° + \Theta_{Tr}$ | 120° | θ-60° | $\vec{V}_2$ | $\vec{V}_3$ | $\vec{V}_6$ | — | $T_1 = [K\sin(60° - \theta_{rel}) + \lambda] \cdot T_S$ |
| | C1 | 120° | $120° + \Theta_{Tr}$ | θ-120° | $\vec{V}_2$ | $\vec{V}_3$ | $\vec{V}_5$ | — | $T_2 = K\sin(\theta_{rel}) \cdot T_S$ |
| | C2 | $120° + \Theta_{Tr}$ | 180° | θ-120° | | | | | For both conditions 1) & 2): |
| | D1 | 180° | $180° + \Theta_{Tr}$ | θ-180° | $\vec{V}_3$ | $\vec{V}_4$ | $\vec{V}_1$ | | $T_3 = T_z = \lambda T_S$ Note 3 |
| | D2 | $180° + \Theta_{Tr}$ | 240° | θ-180° | $\vec{V}_3$ | $\vec{V}_4$ | $\vec{V}_6$ | | $T_0 = T_s - (T_1 + T_2 + T_3)$ |
| | E1 | 240° | $240° + \Theta_{Tr}$ | θ-240° | $\vec{V}_4$ | $\vec{V}_5$ | $\vec{V}_2$ | | where $K = \sqrt{3} \cdot \frac{|V_{ref}|}{V_{DC}}, \lambda = \frac{T_Z}{T_S}$, and |
| | E2 | $240° + \Theta_{Tr}$ | 300° | θ-240° | $\vec{V}_4$ | $\vec{V}_5$ | $\vec{V}_1$ | | |
| | F1 | 300° | $300° + \Theta_{Tr}$ | θ-300° | $\vec{V}_5$ | $\vec{V}_6$ | $\vec{V}_3$ | | $\frac{|V_{ref}|}{V_{DC}} \leq \frac{1 - 2\lambda}{\sqrt{3}}$ |
| | F2 | $300° + \Theta_{Tr}$ | 360° | θ-300° | $\vec{V}_5$ | $\vec{V}_6$ | $\vec{V}_2$ | | |
| | | | | | $\vec{V}_6$ | $\vec{V}_1$ | $\vec{V}_4$ | | |
| | | | | | $\vec{V}_6$ | $\vec{V}_1$ | $\vec{V}_3$ | | |
| New SVM Example #2 | A | 0° | 60° | θ-0° | $\vec{V}_1$ | $\vec{V}_2$ | $\vec{V}_4$ | $\vec{V}_5$ | $T_1 = [K\sin(60° - \theta_{rel}) + \lambda] \cdot T_S$ |
| | B | 60° | 120° | θ-60° | $\vec{V}_2$ | $\vec{V}_3$ | $\vec{V}_5$ | $\vec{V}_6$ | $T_2 = [K\sin(\theta_{rel}) + \lambda] \cdot T_S$ |
| | C | 120° | 180° | θ-120° | $\vec{V}_2$ | $\vec{V}_3$ | $\vec{V}_5$ | $\vec{V}_6$ | $T_3 = T_z = \lambda T_S$ |
| | D | 180° | 240° | θ-180° | $\vec{V}_3$ | $\vec{V}_4$ | $\vec{V}_6$ | $\vec{V}_1$ | $T_4 = T_z = \lambda T_S$ |
| | E | 240° | 300° | θ-240° | $\vec{V}_4$ | $\vec{V}_5$ | $\vec{V}_1$ | $\vec{V}_2$ | $T_0 = T_s - (T_1 + T_2 + T_3 + T_4)$ |
| | F | 300° | 360° | θ-300° | $\vec{V}_5$ | $\vec{V}_6$ | $\vec{V}_2$ | $\vec{V}_3$ | where $K = \sqrt{3} \cdot \frac{|V_{ref}|}{V_{DC}}, \lambda = \frac{T_z}{T_S}$, and |
| | | | | | $\vec{V}_6$ | $\vec{V}_1$ | $\vec{V}_3$ | $\vec{V}_4$ | $\frac{|V_{ref}|}{V_{DC}} \leq \frac{1 - 4\lambda}{\sqrt{3}}$ |

Note 1:
The $3^{rd}$ and $4^{th}$ active vectors (if any) come from the pseudo zero vectors being used.

Note 2:
$\Theta_{Tr}$ is a transition angle for new sectors (e.g.: A1, A2, B1, B2, and etc), and $0° < \Theta_{Tr} < 60°$.

Note 3:
Pseudo zero vector time $T_z = \lambda T_S \geq T_{min}$, where $T_{min}$ is PWM dead time + driver delay + ADC sampling time.

New SVM Example #1

SVM With One Pseudo Zero Vector

As shown in FIGS. 7A and 7B, the reference vector in each existing sector (i.e., A, B, C, D, E, and F) can be approximated by two different sets of active vectors. A transition angle $\Theta_{Tr}$ ($0° < \Theta_{Tr} < 60°$) is introduced to get new sectors A1, A2, B1, B2, and so on as shown in Table 2. Therefore in FIG. 7A the reference vector 210 is in sector A1, and in FIG. 7B the reference vector 220 is in sector A2. At the transition angles the reference vector approximation transits from one set of active vectors to another set of active vectors for the new SVMs. $\Theta_{Tr}$ can be different in different existing sectors. For simplicity, we can choose the same value, e.g., $\Theta_{Tr} = 30°$, for all the sectors.

Calculations when $0° \leq \theta_{rel} < \Theta_{Tr}$

Using the reference vector 210 in sector A as shown in FIG. 7A as an example, the following shows the calculations when $0° \leq \theta_{rel} < \Theta_{Tr}$. Using volt-second balancing:

$$\vec{V}_{ref} = \frac{T_0}{T_S}\vec{V}_0 + \frac{T_1}{T_S}\vec{V}_1 + \frac{\frac{T_2}{T_2' + T_z}}{T_S}\vec{V}_2 + \frac{\frac{T_3}{T_z}}{T_S}\vec{V}_5 \quad (8)$$

$$T_S = T_0 + T_1 + \underbrace{(T_2' + T_z)}_{T_2} + \underbrace{T_z}_{T_3} \quad (9)$$

Choose $T_z$ more than or equal to $T_{min}$ (which is PWM dead time+driver delay+ADC sampling time). For simplicity, select $$T_3 = T_z = \lambda T_S \geq T_{min} \quad (10)$$

where:
λ—A constant and $$\lambda = \frac{T_z}{T_S} (0 \le \lambda < 1),$$

e.g., if $T_S=50$ μs and $T_{min}=2$ μs, we can select $$\lambda = \frac{1}{25}.$$

Solve Equations (8) to (10) to get $$T_1 = K \sin(60°-\theta_{rel}) \cdot T_S \quad (11)$$

$$T_2 = T_2' + T_z = [K \sin(\theta_{rel}) + \lambda] \cdot T_S \quad (12)$$

$$T_1 + T_2 + T_3 = [K \sin(60°+\theta_{rel}) + 2\lambda] \cdot T_S \quad (13)$$

So the zero vector time is $$T_0 = T_S - (T_1 + T_2 + T_3) = [(1-2\lambda) - K \sin(60°+\theta_{rel})] T_S \quad (14)$$

where:
$T_0$—Time of existing zero vector(s) is applied. The zero vector(s) can be $\vec{V}_0$ [000], or $\vec{V}_7$ [111], or both
$T_z$—Time of pseudo zero vector is applied
$T_1$—Time of the $1^{st}$ active vector is applied within one sampling period
$T_2$—Time of the $2^{nd}$ active vector is applied within one sampling period
$T_3$—Time of the $3^{rd}$ active vector is applied within one sampling period, which is part of the pseudo zero vector being used
K—

$$K = \sqrt{3} \cdot \frac{|V_{ref}|}{V_{DC}}.$$

$|V_{ref}|$ is the amplitude of $\vec{V}_{ref}$, and $V_{DC}$ is the inverter DC link voltage
$T_S$—Sampling period
As $T_0 \ge 0$ all the time, from Equation (14) we find $K \le 1-2\lambda$, so the inverter DC link voltage utilization without over-modulation is $$\eta = \frac{|V_{ref}|}{V_{DC}} \le \frac{1-2\lambda}{\sqrt{3}} \quad (15)$$

Calculations when $\Theta_{Tr} \le \theta_{rel} < 60°$
Using the reference vector 220 in sector A as shown in FIG. 7B as an example, the following shows the calculations when $\Theta_{Tr} \le \theta_{rel} < 60°$. Using volt-second balancing:

$$\vec{V}_{ref} = \frac{T_0}{T_S} \vec{V}_0 + \frac{\frac{T_1}{T_1'+T_z}}{T_S} \vec{V}_1 + \frac{T_2}{T_S} \vec{V}_2 + \frac{\frac{T_3}{T_z}}{T_S} \vec{V}_4 \quad (16)$$

$$T_S = T_0 + \underbrace{(T_1' + T_Z)}_{T_1} + T_2 + \underbrace{T_z}_{T_3} \quad (17)$$

Similarly, select $T_z = \lambda T_S$, i.e., $$T_3 = \lambda T_S \ge T_{min} \quad (18)$$

Solve Equations (16) and (17) to get $$T_1 = T_1' + T_z = [K \sin(60°-\theta_{rel}) + \lambda] \cdot T_S \quad (19)$$

$$T_2 = K \sin(\theta_{rel}) \cdot T_S \quad (20)$$

$$T_1 + T_2 + T_3 = [K \sin(60°+\theta_{rel}) + 2\lambda] \cdot T_S \quad (21)$$

So the zero vector time is $$T_0 = T_S - (T_1 + T_2 + T_3) = [(1-2\lambda) - K \sin(60°+\theta_{rel})] \cdot T_S \quad (22)$$

Likewise, it can be found that the inverter DC link voltage utilization without over-modulation is the same as Equation (15). So the new SVM Example #1 has one maximum inverter DC link voltage utilization without over-modulation, which is $$\eta_{max} = \frac{1-2\lambda}{\sqrt{3}} \quad (23)$$

Figure 9:
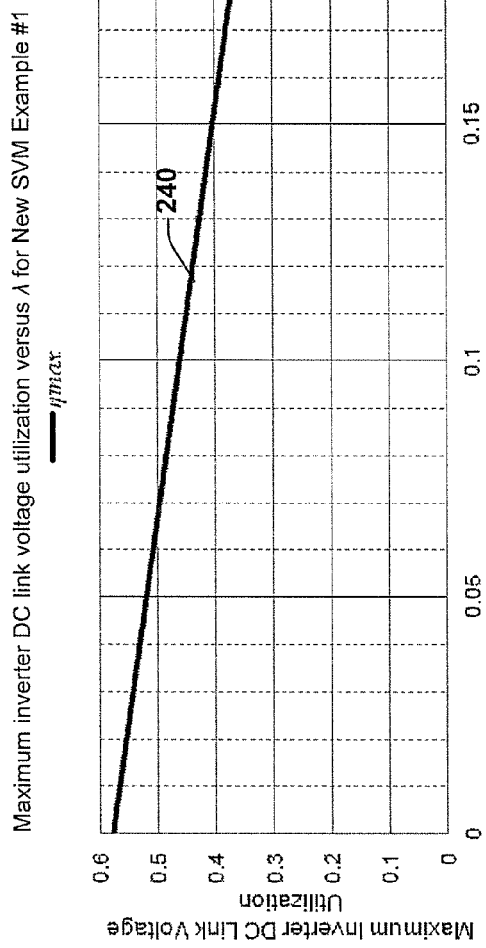
FIG. 9 is a graph illustrating a maximum inverter DC link voltage utilization versus λ for a reference vector in accordance with the embodiment of FIGS. 7A-7B.

A plot of Equation (23) is shown in FIG. 9, which is the maximum inverter DC link voltage 240 utilization versus λ for Example 1. When λ=0, the new SVM becomes the existing SVM and $$\eta \le \frac{1}{\sqrt{3}}.$$

Figure 10:
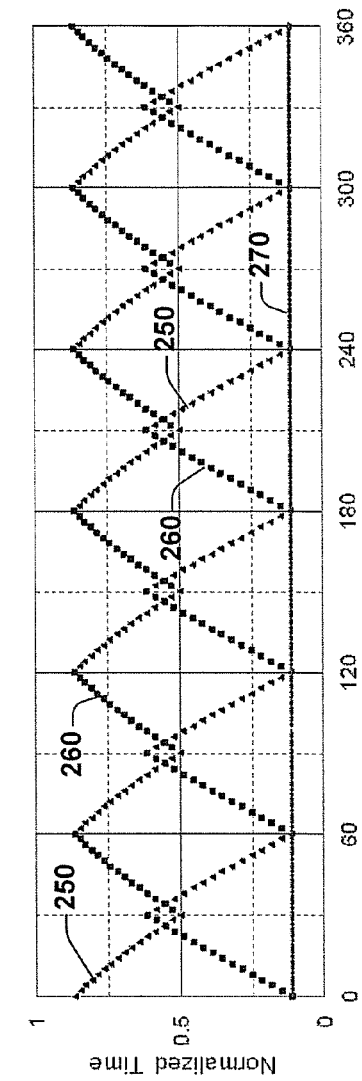
FIG. 10 is a graph illustrating normalized time versus reference vector angle for conventional space vector modulation (SVM) with use of pseudo zero vectors such as that shown in FIGS. 7A-7B according to one embodiment.

Plots of normalized time $T_1$ 250, $T_2$ 260, and $T_3$ 270 for the new SVM Example #1 are shown in FIG. 10 with $\Theta_{Tr}=30°$ for all the sectors. It can be found that $T_1$, $T_2$ and $T_3$ are all non-zero (except when K is very small or K=0). So the new SVM Example #1 can easily solve the problem (1) mentioned previously. Using single-shunt current sensing, at any time it is a good choice to measure inverter DC link current during two time intervals $T_1$ and $T_2$.

New SVM Example #2

SVM With Two Pseudo Zero Vectors

Using the reference vector 230 in sector A as shown in FIG. 8 as an example, the following shows the calculations. Using volt-second balancing:

$$\vec{V}_{ref} = \frac{T_0}{T_S} \vec{V}_0 + \frac{\frac{T_1}{T_1'+T_z}}{T_S} \vec{V}_1 + \frac{\frac{T_2}{T_2'+T_z}}{T_S} \vec{V}_2 + \frac{\frac{T_3}{T_z}}{T_S} \vec{V}_4 + \frac{\frac{T_4}{T_z}}{T_S} \vec{V}_5 \quad (24)$$

$$T_S = T_0 + \underbrace{(T_1' + T_z)}_{T_1} + \underbrace{(T_2' + T_z)}_{T_2} + \underbrace{2T_z}_{T_3+T_4} \quad (25)$$

Similarly, select $T_z = \lambda T_S$, i.e., $$T_3 = T_4 = \lambda T_S \ge T_{min} \quad (26)$$

Solve Equations (24) to (26) to get $$T_1 = T_1' + T_z = [K \sin(60°-\theta_{rel}) + \lambda] \cdot T_S \quad (27)$$

$$T_2 = T_2' + T_z = [K \sin(\theta_{rel}) + \lambda] \cdot T_S \quad (28)$$

$$T_1 + T_2 + T_3 + T_4 = [K \sin(60°+\theta_{rel}) + 4\lambda] \cdot T_S \quad (29)$$

So the zero vector time is $$T_0 = T_S - (T_1 + T_2 + T_3 + T_4) = [(1-4\lambda) - K \sin(60°+\theta_{rel})] \cdot T_S \quad (30)$$

where:

$T_0$—Time of existing zero vector(s) is applied. The zero vector(s) can be $\vec{V}_0$ [000], or $\vec{V}_7$ [111], or bot.

$T_z$—Time of pseudo zero vectors are applied $T_1$—Time of the $1^{st}$ active vector is applied within one sampling period $T_2$—Time of the $2^{nd}$ active vector is applied within one sampling period $T_3$, $T_4$—Time of the $3^{rd}$ and $4^{th}$ active vectors are applied within one sampling period, which are part of the pseudo zero vectors being used

K—

$$K = \sqrt{3} \cdot \frac{|V_{ref}|}{V_{DC}}.$$

$|V_{ref}|$ is the amplitude of $\vec{V}_{ref}$, and $V_{DC}$ is the inverter DC link voltage $T_S$—Sampling period As $T_0 \geq 0$ all the time, from Equation (30) we find $K \leq 1-4\lambda$, so the inverter DC link voltage utilization without over-modulation is $$\eta = \frac{|V_{ref}|}{V_{DC}} \leq \frac{1-4\lambda}{\sqrt{3}} \quad (31)$$

So the maximum inverter DC link voltage utilization without over-modulation is $$\eta'_{max} = \frac{1-4\lambda}{\sqrt{3}} \quad (32)$$

Figure 11:
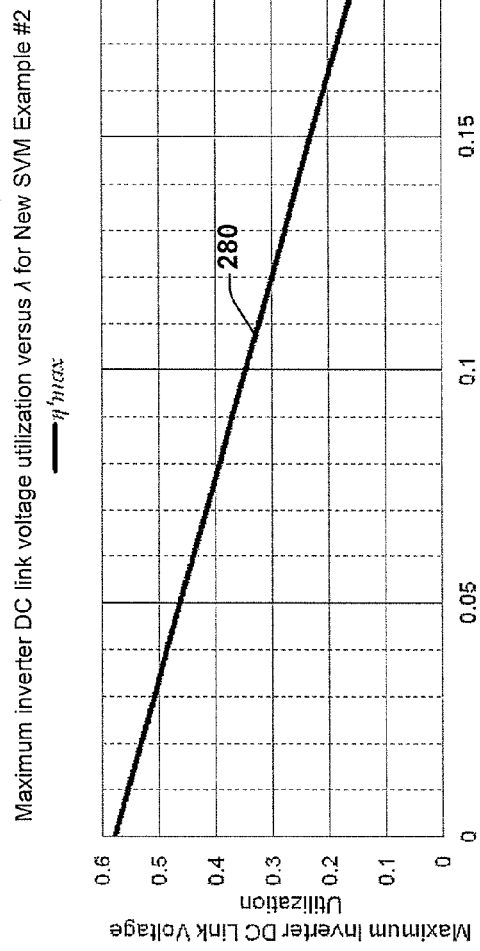
FIG. 11 is a graph illustrating a maximum inverter DC link voltage utilization versus λ for a reference vector in accordance with the embodiment of FIG. 8.

Plot of Equation (32) is shown in FIG. 11 at 280, which shows the maximum inverter DC link voltage utilization versus λ for new Example 2. When λ=0, the new SVM becomes the existing SVM and $$\eta \leq \frac{1}{\sqrt{3}}.$$

Figure 12:
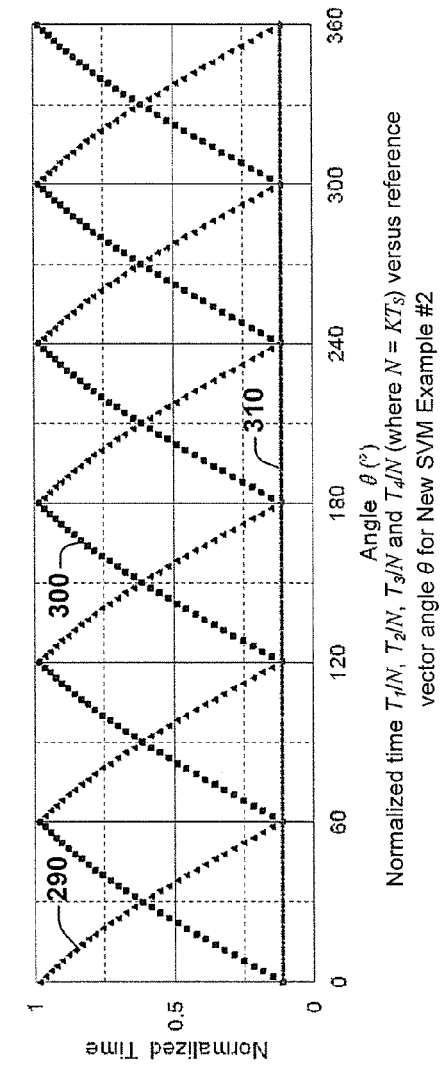
FIG. 12 is a graph illustrating normalized time versus reference vector angle for conventional space vector modulation (SVM) with use of pseudo zero vectors such as that shown in FIG. 8 according to one embodiment.

Plots of normalized time $T_1$ 290, $T_2$ 300, $T_3$ and $T_4$ 310 for new SVM Example #2 are shown in FIG. 12. It can be found that both $T_1$ and $T_2$ are longer than $T_{min}$ in all conditions (as long as $\lambda T_S \geq T_{min}$), even when K=0 (i.e.: $|V_{ref}|=0$). So the New SVM Example #2 not only can solve the problem (1), but also can completely solve the problem (2) mentioned above. Using single-shunt current sensing, at any time it is a good choice to measure inverter DC link current during two time intervals $T_1$ and $T_2$.

Figure 14:
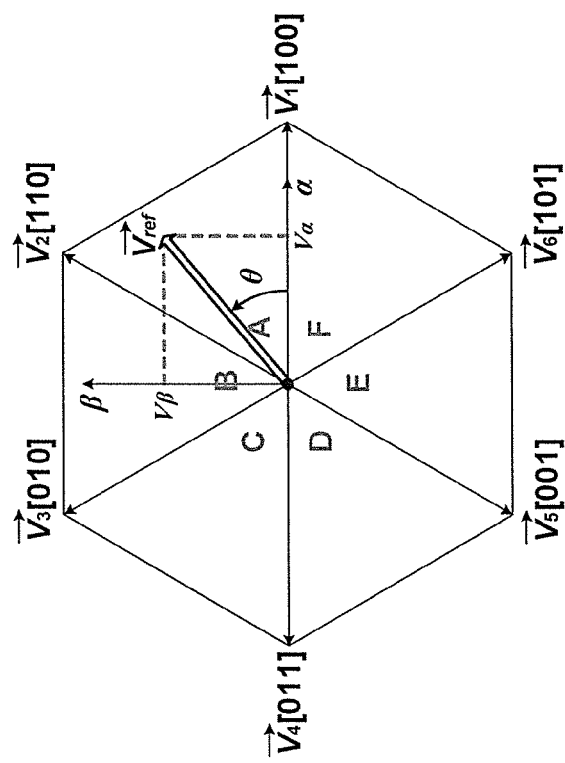
FIG. 14 is a space vector hexagon showing a reference vector in polar coordinates and Cartesian coordinates, respectively.

Usage of new SVM in motor control: The connections of SVM in a motor control are shown in FIGS. 13A and 13B. The input to the new SVM can be the polar coordinates (i.e., radial coordinate $|V_{ref}|$ and angular coordinate θ) of the reference vector $\vec{V}_{ref}$ as shown in FIG. 13A, which has been discussed above. The inputs to the SVM can also be the Cartesian coordinates $(V_\alpha, V_\beta)$ of the reference vector $\vec{V}_{ref}$ in the α-β Cartesian coordinate system, as shown in FIG. 13B. The coordinate systems in the SVM space vector hexagon are shown in FIG. 14. The Polar-to-Cartesian Transform is:

$$V_\alpha = |V_{ref}|\cos(\theta) \quad (33)$$

$$V_\beta = |V_{ref}|\sin(\theta) \quad (34)$$

With Equations (33) and (34), all the formulas listed in Table 2 can be transferred to format with inputs of $V_\alpha$ and $V_\beta$. For example, the time calculations of New SVM Example #1 in sector A1 become $$T_1 = \frac{\sqrt{3}\,T_S}{2V_{DC}} \cdot \left(\sqrt{3}\,V_\alpha - V_\beta\right) \quad (35)$$

$$T_2 = \frac{\sqrt{3}\,T_S}{V_{DC}} \cdot V_\beta + \lambda T_S \quad (36)$$

$$T_3 = T_z = \lambda T_S \quad (37)$$

$$T_0 = T_S - (T_1 + T_2 + T_3) \quad (38)$$

FIG. 13A shows a control system 320, for example, a motor control system. The control system 320 includes a space vector modulator (SVM) 330 according to the present disclosure that utilizes pseudo zero vectors. The SVM 330 receives a reference signal or reference samples and synthesizes one or more reference vectors based thereon, wherein at least one of the reference vectors employ one or more pseudo zero vectors as described herein. Based on the synthesized reference vector(s), the SVM modulator 330 outputs timing signals 340 to a PWM unit 350 that receives the timing signals 340 and generates PWM control signals 360. The PWM control signals 360 are provided to a three-phase inverter circuit 370 which generates output signals u, v, and w to drive a load 380 such as a three-phase motor. FIG. 13B, as highlighted above, is similar to FIG. 13A, but illustrates receiving an input reference signal in Cartesian coordinates rather than polar coordinates, but generally operates in the same manner as that described above.

Figure 15:
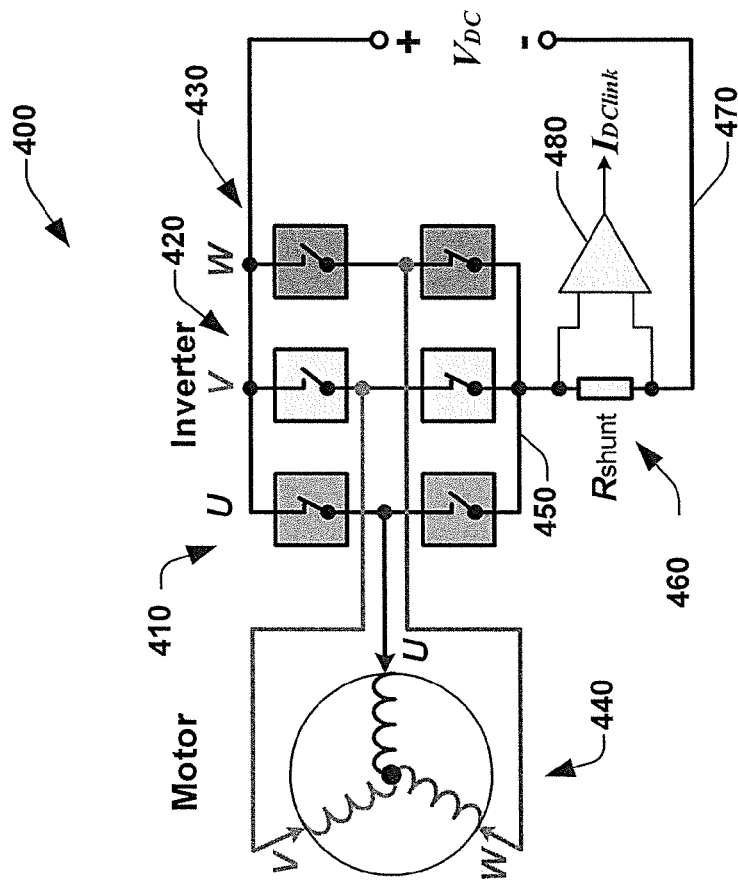
FIG. 15 is a block diagram illustrating a three phase inverter in a control system such as that illustrated in FIGS. 13A-13B that employs single-shunt current sensing according to one embodiment.

Inverter with single-shunt current sensing: The connection of a three-phase two-level voltage source inverter and a motor are shown in FIG. 15 at 400. The six switching devices of the inverter 400, which could be MOSFET, IGBT or similar parts, are controlled by microcontroller PWM signals. As illustrated, the inverter comprises a first pair of series-connected switches 410, a second pair of series-connected switches 420, and a third pair of series-connected switches 430. Each of the series-connected pairs 410, 420, and 430 are connected at a node that forms an output u, v, w that connects to a respective phase of the load 440. Each of the series-connected pairs 410, 420, 430 also couple together at a terminal 450 that couples to a first terminal of a shunt resistor 460 that has a second terminal connected to a reference potential 470. An amplifier 480 has input terminals coupled to the first and second terminals of the shunt resistor 460, respectively, wherein an output of the amplifier 480 reflects a current conducting through the shunt resistor 460.

The motor windings can be wired in a star (as shown) or a delta configuration. SVM is used to control the PWM to create three-phase sinusoidal waveforms to the motor windings. The shunt resistor $R_{shunt}$ 460 is inserted into the inverter DC link to sense the DC link current. If needed, the amplifier 480 is used to amplify the resistor voltage drop which is proportional to the DC link current. Note that a Hall sensor, a current transformer, or other current sensors can replace the shunt resistor to sense the DC link current.

Compared to dual-shunt and triple-shunt current sensing, single-shunt current sensing has the following important advantages:

1) Cost reduction as a result of only one current sensor, one amplifier (if any), and one ADC channel are used. In contrast, dual-shunt current sensing and triple-shunt current sensing need multiple current sensors, amplifiers (if any) and ADC channels.

2) No need to calibrate amplifier gains and offsets (which may due to component tolerance, fluctuating temperature, aging, and etc) since the same current sensing circuit and ADC channel are used for all the current measurements of motor phases.

Figures 16A, 16B:
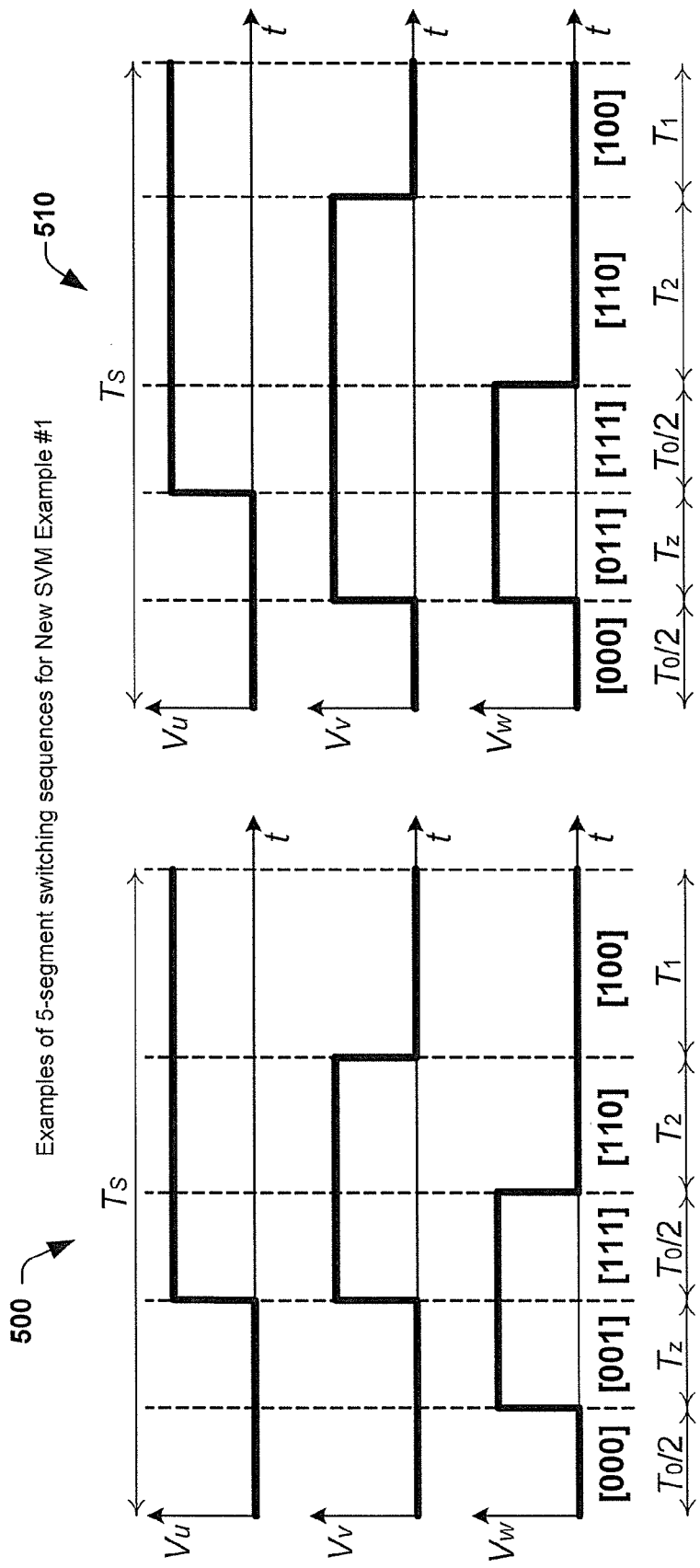
FIGS. 16A-16B illustrate examples of 5-segment switching sequences for the example of FIGS. 7A-7B.
Figures 18A, 18B:
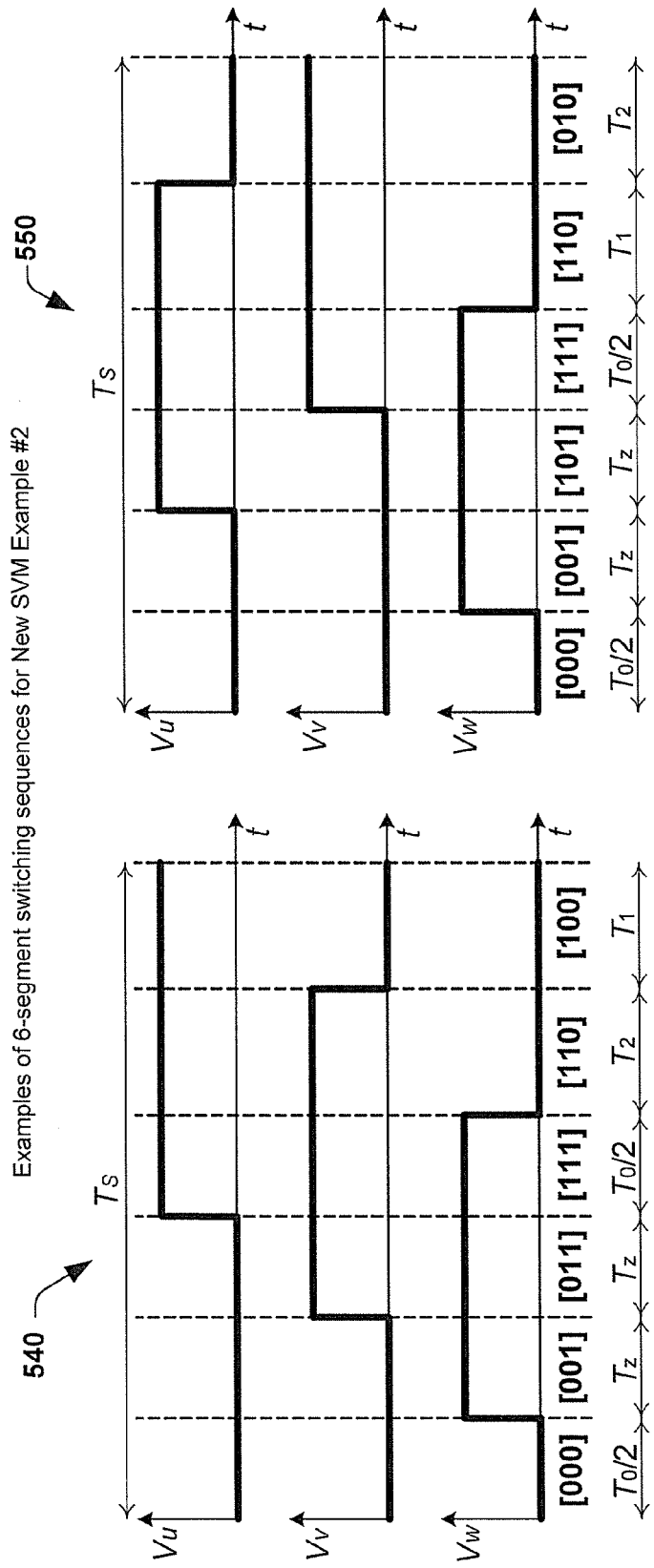
FIGS. 18A-18B illustrate examples of 6-segment switching sequences for the example of FIG. 8.

3) Simpler and easier electronic schematics and PCB design. Switching sequence design: There are a lot of switching sequence combinations for the new SVMs, depending on different sequencings of active/zero vectors, splitting of the duty cycles of the vectors, and choice of existing zero vectors (i.e., to choose zero vector $\vec{V}_0$ [000], or $\vec{V}_7$ [111], or both). It is difficult to list all the switching sequences here. This section only gives some examples of the switching sequences, which can be easily implemented using Infineon microcontrollers or other type microcontrollers. FIGS. 16A and 16B show examples of 5-segment switching sequences 500, 510 for new SVM Example #1. FIGS. 17A and 17B show examples of 5-segment switching sequences 520, 530 for new SVM Example #2, FIGS. 18A and 18B show examples of 6-segment switching sequences 540, 550, and FIGS. 19A and 19B show examples of 7-segment switching sequences 560, 570.

Figure 20:
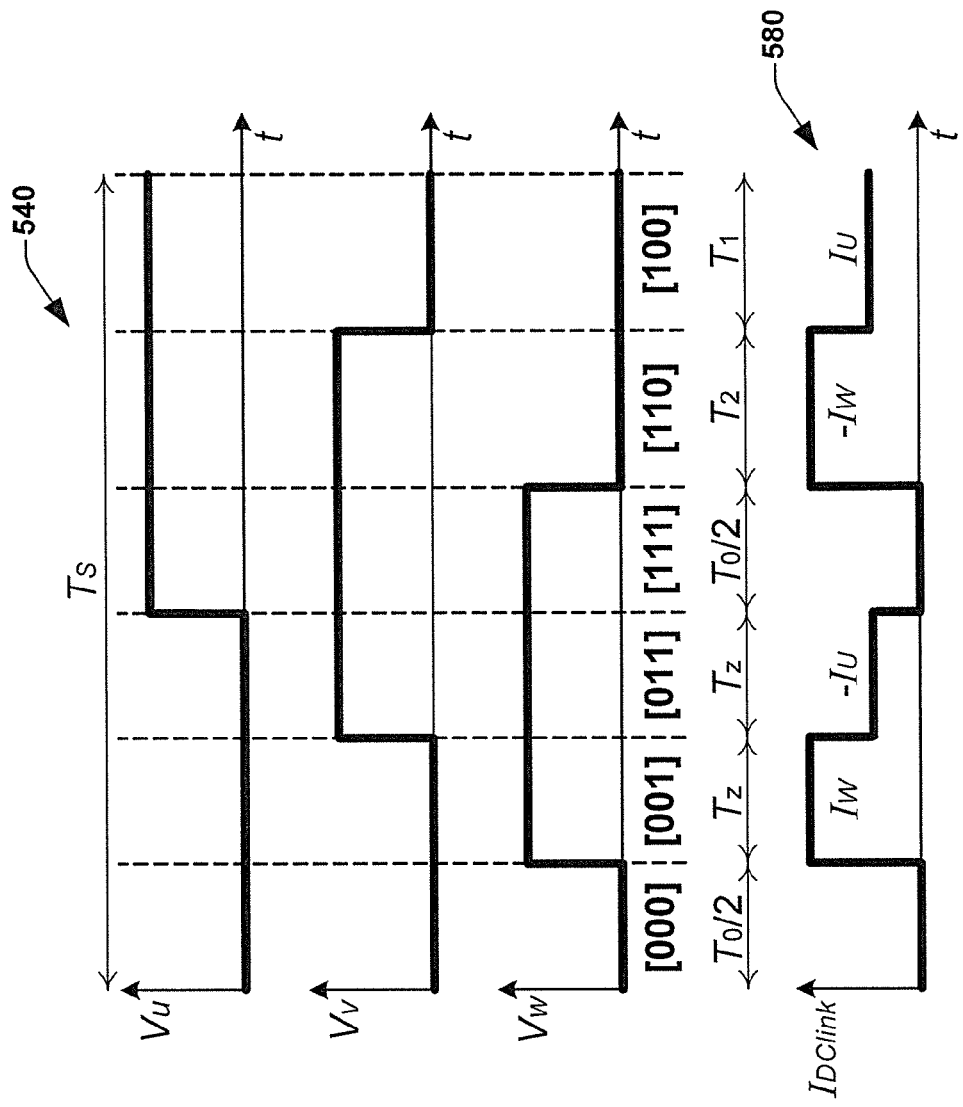
FIG. 20 illustrates the DC link current corresponding to the switching sequences shown in FIG. 18A.

Current reconstruction: Two/three motor phase currents can be reconstructed by using single-shunt current sensing. In each PWM cycle, the inverter DC link current is measured at least twice during two different active vector segments to get two motor phase currents. The ADC samplings are normally triggered near the center of the active vector segments to avoid current transitions. Table 3 shows the inverter DC link current of different PWM segments. As an example, FIG. 20 shows the DC link current $I_{DClink}$ 580 corresponding to the switching sequences 540 shown earlier in FIG. 18A. Two phase currents can be measured at two PWM active vector segments which are more than or equal to $T_{min}$, e.g.: $I_{DClink}=-I_W$ during $T_2$ and $I_{DClink}=I_U$ during $T_1$ in FIG. 20 since $T_2 \geq T_{min}$ and $T_1 \geq T_{min}$. With two phase currents, the third motor phase current can be calculated easily because $I_U+I_V+I_W=0$.

TABLE 3

Inverter DC link current of different PWM segments

| PWM Segment | | Inverter DC link current $I_{DClink}$ Note 1 | Remark |
|---|---|---|---|
| Active Vectors | $\vec{V}_1$ [100] | $I_U$ | Take current sample for motor phase current |
| | $\vec{V}_2$ [110] | $-I_W$ | |
| | $\vec{V}_3$ [010] | $I_V$ | |
| | $\vec{V}_4$ [011] | $-I_U$ | |
| | $\vec{V}_5$ [001] | $I_W$ | |
| | $\vec{V}_6$ [101] | $-I_V$ | |
| Zero Vectors | $\vec{V}_0$ [000] | 0 | If needed, can be used for channel offset calibration |
| | $\vec{V}_7$ [111] | 0 | |

Note 1
$I_U$, $I_V$ and $I_W$ are the currents of motor phases U, V and W, respectively.

Figure 21:
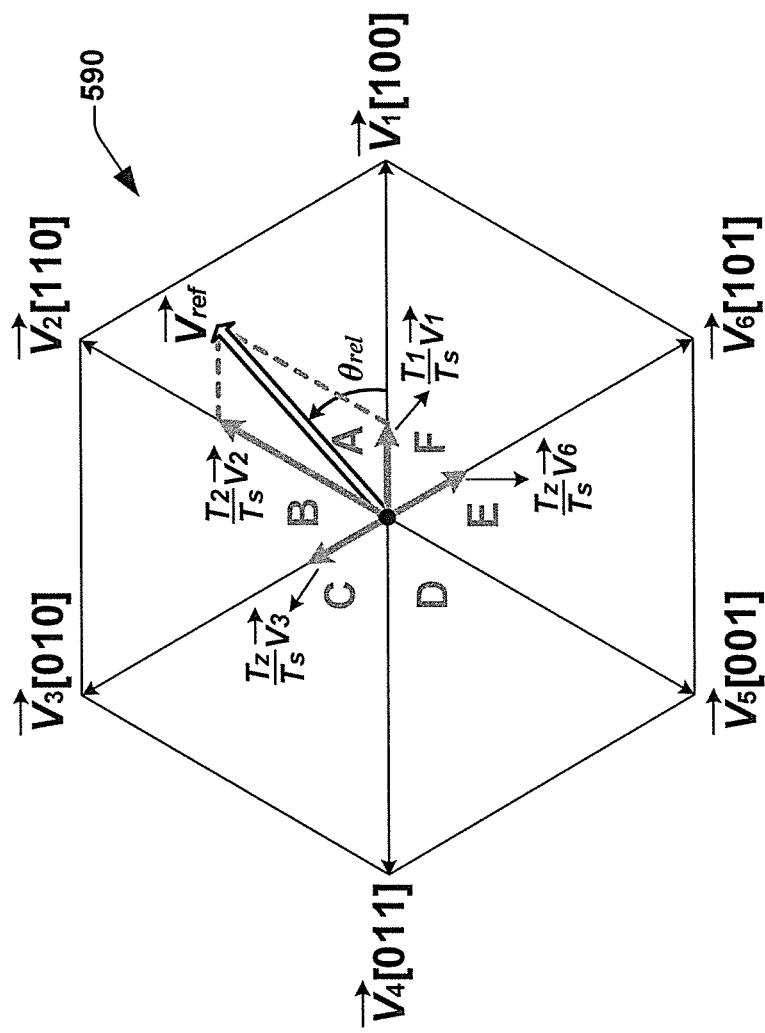
FIG. 21 is a space vector hexagon illustrating an alternative reference vector approximation with one pseudo zero vector according to one embodiment.

Using a reference vector $\vec{V}_{ref}$ in sector A as an example, FIG. 21 shows an alternative approximation of the reference vector 590 with one pseudo zero vector in accordance with another embodiment of the disclosure. Clearly, calculations for $T_1$ and $T_2$ are the same as those for the existing SVM, and the reference vector 590 is actually approximated by four active vectors. It is another example of selective utilization of a pseudo zero vector to easily solve the problems mentioned above.

As highlighted above, SVM is regularly employed for industry and automotive motor control applications, and used in the sinusoidal commutation control (such as V/f, FOC, and DTC) of PMSM and ACIM to generate sine waveforms from three-phase inverters. Sinusoidal commutation motor control with a single-shunt current sensing resistor inserted in the inverter DC link is a desired solution when compared to dual-shunt and triple-shunt current sensing techniques, owing to its important advantages such as low cost, simplicity and etc. However, two current samples within one PWM cycle are needed for correct motor phase current reconstruction with single-shunt current sensing. But with existing SVM, the accurate current construction is difficult when the reference voltage space vector is crossing a sector border, as in that situation only one current sample can be measured. It is a problem for most of the normal speed motor control with SVM and single-shunt current sensing.

The enhanced SVM proposed in accordance with one embodiment of the disclosure can solve the above-mentioned problem. With the new SVM technology, one can offer low-cost, high-quality, more reliable, and unique motor control solutions (e.g., sensorless FOC with single-shunt current sensing) to customers. The enhanced SVM may also be used in three-phase power inverter control for uninterruptible power supplies, renewable energy, and etc.

Figure 22B:
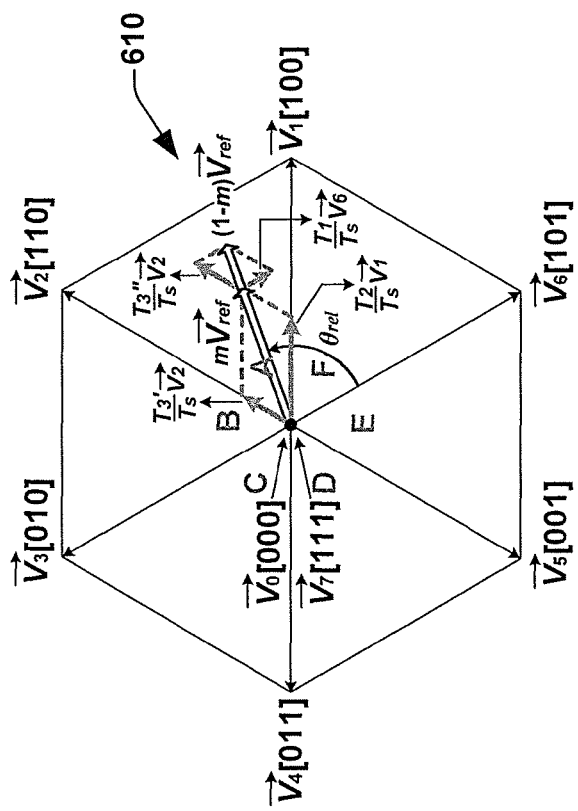
FIGS. 22A-22B are space vector hexagons illustrating a reference vector approximation employing enhanced SVM that utilizes three adjacent active vectors according to one embodiment of the disclosure.
Figure 22A:
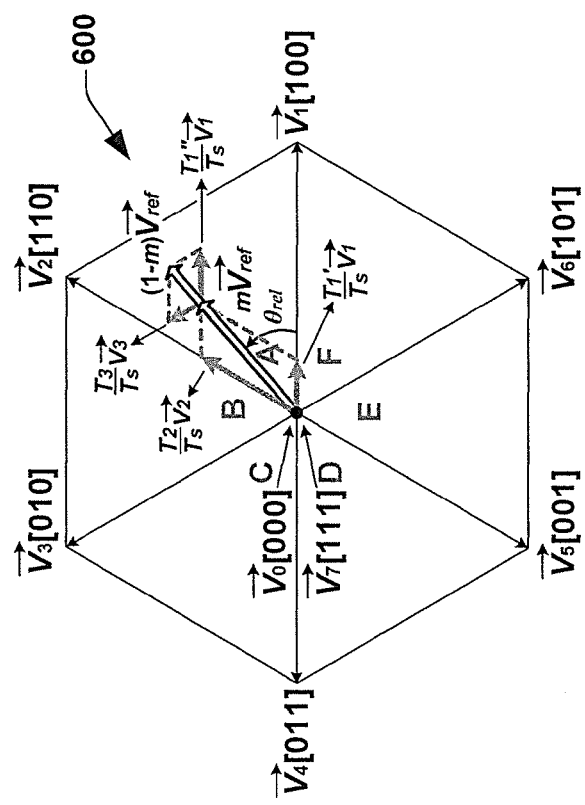

To solve the problems highlighted above associated with conventional SVM, the present disclosure according to the present embodiment introduces innovative approximations of the reference vector with different active vectors, instead of two adjacent active vectors in existing SVM. New approximations of the enhanced SVM are shown in FIGS. 22A-22B. One portion (i.e., $m\vec{V}_{ref}$ with $0 \leq m \leq 1$) of the reference vectors 600, 610 is approximated by two adjacent active vectors just like the existing SVM, and the remaining portion $(1-m)\vec{V}_{ref}$ is approximated by two non-adjacent and 120°-separated active vectors. The enhanced SVM is elaborated below. One special case of the enhanced SVM is when m=1, the entire reference vector $\vec{V}_{ref}$ is approximated by two adjacent active vectors in each sector, and the enhanced SVM becomes the existing SVM as shown in FIG. 4. Another special case of the enhanced SVM is when m=0, the entire reference vector $\vec{V}_{ref}$ is approximated by two non-adjacent and 120°-separated active vectors in each sector. So the approximations 600, 610 in FIGS. 22A and 22B become approximations 620, 630 in FIGS. 23A and 23B, respectively. The enhanced SVM becomes another new SVM (which is called "Enhanced SVM at m=0" in this disclosure) and which is described in detail below.

Table 4 compares and summarizes the existing SVM and proposed new SVMs.

TABLE 4

Comparison of existing SVM and proposed enhanced SVMs

| | Sector | $\vec{V}_{ref}$ Angle θ (limit 0° ≤ θ < 360°) Start | End | $\theta_{rel}$ | Active Vectors For $\vec{V}_{ref}$ Approximation 1st | 2nd | 3rd | Formulas |
|---|---|---|---|---|---|---|---|---|
| Existing SVM (A special case of Enhanced SMV at m = 1) | A | 0° | 60° | θ-0° | $\vec{V}_1$ | $\vec{V}_2$ | — | $T_1 = K\sin(60° - \theta_{rel}) \cdot T_S$ |
| | B | 60° | 120° | θ-60° | $\vec{V}_2$ | $\vec{V}_3$ | — | $T_2 = K\sin(\theta_{rel}) \cdot T_S$ |
| | C | 120° | 180° | θ-120° | $\vec{V}_3$ | $\vec{V}_4$ | — | $T_0 = T_S - (T_1 + T_2)$ |
| | D | 180° | 240° | θ-180° | $\vec{V}_4$ | $\vec{V}_5$ | — | where $K = \sqrt{3} \cdot \frac{|V_{ref}|}{V_{DC}}$ and $\frac{|V_{ref}|}{V_{DC}} \leq \frac{1}{\sqrt{3}}$ |
| | E | 240° | 300° | θ-240° | $\vec{V}_5$ | $\vec{V}_6$ | — | |
| | F | 300° | 360° | θ-300° | $\vec{V}_6$ | $\vec{V}_1$ | — | |
| Enhanced SVM (0 ≤ m ≤ 1) | AB | $\Theta_{Tr}$ Note 1 | $60° + \Theta_{Tr}$ | θ-0° θ-60° | $\vec{V}_1$ $\vec{V}_2$ | $\vec{V}_2$ $\vec{V}_3$ | $\vec{V}_3$ $\vec{V}_4$ | 1). For $\Theta_{Tr} \leq \theta_{rel} < 60°$: $T_1 = \sqrt{1-m(1-m)} \cdot K \cdot \sin(\Theta_1 - \theta_{rel}) \cdot T_S$ Note 2 |
| | BC | $60° + \Theta_{Tr}$ | $180° + \Theta_{Tr}$ | θ-120° | $\vec{V}_2$ | $\vec{V}_3$ $\vec{V}_4$ | $\vec{V}_4$ $\vec{V}_5$ | $T_2 = mK\sin(\theta_{rel}) \cdot T_S$ |
| | CD | $120° + \Theta_{Tr}$ | $240° + \Theta_{Tr}$ | θ-180° | $\vec{V}_3$ | $\vec{V}_4$ | $\vec{V}_5$ | $T_3 = (1-m)K\sin(\theta_{rel}) \cdot T_S$ |
| | DE | $180° + \Theta_{Tr}$ | $300° + \Theta_{Tr}$ | θ-240° | $\vec{V}_4$ | $\vec{V}_5$ | $\vec{V}_6$ | 2). For $60° \leq \theta_{rel} < 60° + \Theta_{Tr}$: |
| | EF | $240° + \Theta_{Tr}$ | $\Theta_{Tr}$ | θ-300° | $\vec{V}_5$ | $\vec{V}_6$ | $\vec{V}_1$ | $T_1 = (1-m)K\sin(120° - \theta_{rel}) \cdot T_S$ |
| | FA | $300° + \Theta_{Tr}$ | | | $\vec{V}_6$ | $\vec{V}_1$ | $\vec{V}_2$ | $T_2 = mK\sin(120° - \theta_{rel}) \cdot T_S$ $T_3 = \sqrt{1-m(1-m)} \cdot K \cdot \sin(\theta_{rel} - \Theta_3) \cdot T_S$ Note 3 For both conditions 1) and 2): $T_0 = T_s - (T_1 + T_2 + T_3)$ where $K = \sqrt{3} \cdot \frac{|V_{ref}|}{V_{DC}}$, and $\frac{|V_{ref}|}{V_{DC}} \leq \frac{1}{\sqrt{9-3m(3-m)}}$ |
| Enhanced SVM at m = 0 (A special case of Enhanced SVM) | AB | $\Theta_{Tr}$ | $60° + \Theta_{Tr}$ | θ-0° | $\vec{V}_1$ | — | $\vec{V}_3$ | $T_1 = K\sin(120° - \theta_{rel}) \cdot T_S$ |
| | BC | $60° + \Theta_{Tr}$ | $120° + \Theta_{Tr}$ | θ-60° | $\vec{V}_2$ | — | $\vec{V}_4$ | $T_3 = K\sin(\theta_{rel}) \cdot T_S$ |
| | CD | $120° + \Theta_{Tr}$ | $180° + \Theta_{Tr}$ | θ-120° | $\vec{V}_3$ | — | $\vec{V}_5$ | $T_0 = T_s - (T_1 + T_3)$ |
| | DE | $180° + \Theta_{Tr}$ | $240° + \Theta_{Tr}$ | θ-180° | $\vec{V}_4$ | — | $\vec{V}_6$ | where $K = \sqrt{3} \cdot \frac{|V_{ref}|}{V_{DC}}$ and $\frac{|V_{ref}|}{V_{DC}} \leq \frac{1}{3}$ |
| | EF | $240° + \Theta_{Tr}$ | $300° + \Theta_{Tr}$ | θ-240° | $\vec{V}_5$ | — | $\vec{V}_1$ | |
| | FA | $300° + \Theta_{Tr}$ | $\Theta_{Tr}$ | θ-300° | $\vec{V}_6$ | — | $\vec{V}_2$ | |

Note 1:
$\theta_{Tr}$ is a transition angle for new sectors (i.e., AB, BC CD, DE, EF, and FA), and $0° < \theta_{Tr} < 60°$.

Note 2:
$$\Theta_1 = \arctan\left(\frac{\sqrt{3}}{2m-1}\right) + k\pi \text{ where k is an integer. Select k so that } 60° \leq \Theta_1 \leq 120° \text{ for } 0 \leq m \leq 1.$$

Note 3:
$$\Theta_3 = \arctan\left(\frac{\sqrt{3}\,m}{2-m}\right) + k\pi \text{ where k is an integer. Select k so that } 0° \leq \Theta_3 \leq 60° \text{ for } 0 \leq m \leq 1.$$

As highlighted previously, enhanced SVM has advantages over conventional SVM techniques. For example, enhanced SVM is well suited for three-phase motor control with single-shunt current sensing, so it can fully use the advantages of a single-shunt current sensing technique as elaborated in greater detail below. Another advantage of the enhanced SVM is that customers can tune the factor m to obtain different current sampling intervals based on different system requirements and hardware designs, so as to achieve the best performance of motor control with single-shunt current sensing. As three adjacent active vectors are used for the approximation in the enhanced SVM, if necessary, it is possible to take three ADC samplings of the inverter DC link current within one PWM cycle to get three motor phase currents directly (which will be discussed in greater detail below). It will be useful for the application cases that the sum of three motor winding currents is not zero but still use single-shunt current sensing. It is also possible to take only two ADC samplings of the interested motor phase current (e.g., $I_U$ and $I_V$ only) directly within any PWM cycle.

The enhanced SVM at m=0 is also well suited for motor control with single-shunt current sensing. It has long current sampling time intervals within every PWM cycle, so it is possible to use a low-speed, common and low-cost operational amplifier for current signal amplification to further lower the system cost. The enhanced SVM at m=0 has a lower DC link bus voltage utilization. It is not a problem for applications with high DC link voltage, e.g., low-cost PMSM ceiling fan drive with very high DC link voltage (up to 400V DC due to the use of power factor correction).

Enhanced SVM: Using the reference vector in sector A as an example as shown in FIGS. 22A and 22B, the reference vector in each existing sector (i.e., A, B, C, D, E, or F) can be approximated by two different sets of active vectors. A transition angle $\Theta_{Tr}$ (0°<$\Theta_{Tr}$<60°) is introduced to get new combined sectors AB, BC CD, DE, EF, and FA as shown in Table 1. At the transition angles the reference vector approximation transits from one set of active vectors to another set of active vectors for the new SVMs. $\Theta_{Tr}$ can be different in different existing sectors. For simplicity, we can choose the same value, e.g., $\Theta_{Tr}$=30°, for all the sectors.

Calculations when $\Theta_{Tr} \leq \theta_{rel} < 60°$: Using reference vector in sector A as shown in FIG. 22A as an example, the following shows the calculations when $\Theta_{Tr} \leq \theta_{rel} < 60°$. Using volt-second balancing:

$$m\vec{V}_{ref} = \frac{T_0'}{T_S}\vec{V}_0 + \frac{T_1'}{T_S}\vec{V}_1 + \frac{T_2}{T_S}\vec{V}_2 \quad (39)$$

$$(1-m)\vec{V}_{ref} = \frac{T_0''}{T_S}\vec{V}_0 + \frac{T_1''}{T_S}\vec{V}_1 + \frac{T_3}{T_S}\vec{V}_3 \quad (40)$$

Add both sides of Equations (39) and (40), $$\vec{V}_{ref} = \underbrace{\frac{T_0' + T_0''}{T_S}}_{T_0}\vec{V}_0 + \underbrace{\frac{T_1' + T_1''}{T_S}}_{T_1}\vec{V}_1 + \frac{T_2}{T_S}\vec{V}_2 + \frac{T_3}{T_S}\vec{V}_3 \quad (41)$$

$$T_S = \underbrace{(T_0' + T_0'')}_{T_0} + \underbrace{(T_1' + T_1'')}_{T_1} + T_2 + T_3 \quad (42)$$

Solve Equations (39) and (40) to get $$T_1' = mK\sin(60° - \theta_{rel}) \cdot T_S \quad (43)$$

$$T_1'' = (1-m)K\sin(120° - \theta_{rel}) \cdot T_S \quad (44)$$

$$T_2 = mK\sin(\theta_{rel}) \cdot T_S \quad (45)$$

$$T_3 = (1-m)K\sin(\theta_{rel}) \cdot T_S \quad (46)$$

where:
$T_0$—Time of zero vector(s) is applied. The zero vector(s) can be $\vec{V}_0$ [000], or $\vec{V}_7$ [111], or both
$T_1$—Time of the $1^{st}$ active vector is applied within one sampling period
$T_2$—Time of the $2^{nd}$ active vector is applied within one sampling period
$T_3$—Time of the $3^{rd}$ active vector is applied within one sampling period
K—

$$K = \sqrt{3} \cdot \frac{|V_{ref}|}{V_{DC}}.$$

$|V_{ref}|$ is me amplitude of $\vec{V}_{ref}$, and $V_{Dc}$ is the inverter DC link voltage
$T_S$—Sampling period
Add both sides of Equations (43) and (44), it can be found that $$T_1 = T_1' + T_1'' = \sqrt{1-m(1-m)} \cdot K\sin(\Theta_1 - \theta_{rel}) \cdot T_S \quad (47)$$

where $\Theta_1$ is an angle depending on the factor m only, and $$\Theta_1 = \arctan\left(\frac{\sqrt{3}}{2m-1}\right) + k\pi \quad (48)$$

where k is an integer and k=0, ±1, ±2, ±3, or . . . . Select k so that 60°≤$\Theta_1$≤120° for 0≤m≤1, e.g.: $\Theta_1$=120° when m=0.
Add both sides of Equations (45), (46) and (47) to get $$T_1 + T_2 + T_3 = \sqrt{3-m(3-m)} \cdot K\sin(\Theta_2 + \theta_{rel}) \cdot T_S \quad (49)$$

where:
$\Theta_2$—An angle depending on m only, and $$\Theta_2 = \arctan\left(\frac{\sqrt{3}}{3-2m}\right),$$

e.g.: $\Theta_2$=30° when m=0. The zero vector time is $$T_0 = T_0' + T_0'' \quad (50)$$
$$= T_S - (T_1 + T_2 + T_3)$$
$$= [1 - \sqrt{3-m(3-m)} \cdot K\sin(\Theta_2 + \theta_{rel})] \cdot T_S$$

As $T_0 \geq 0$ (or $T_1 + T_2 + T_3 \leq T_S$) all the time, so $\sqrt{3-m(3-m)} \cdot K \leq 1$, so the inverter DC link voltage utilization without over-modulation is $$\eta = \frac{|V_{ref}|}{V_{DC}} \leq \frac{1}{\sqrt{9-3m(3-m)}} \quad (51)$$

Calculations when 60°≤$\theta_{rel}$<60°+$\Theta_{Tr}$: Using reference vector in sector A as an example as shown in FIG. 22B, the following show the slightly different calculations when 60°≤$\theta_{rel}$<60°+$\Theta_{Tr}$. Similarly we have $$\vec{V}_{ref} = \frac{T_0}{T_S}\vec{V}_0 + \frac{T_1}{T_S}\vec{V}_6 + \frac{T_2}{T_S}\vec{V}_1 + \frac{\overbrace{T_3' + T_3''}^{T_3}}{T_S}\vec{V}_2 \quad (52)$$

$$T_S = T_0 + T_1 + T_2 + \underbrace{(T_3' + T_3'')}_{T_3} \quad (53)$$

Solve Equations (52) and (53), we have $$T_1 = (1-m)K\sin(120° - \theta_{rel}) \cdot T_S \quad (54)$$

$$T_2 = mK\sin(120° - \theta_{rel}) \cdot T_S \quad (55)$$

$$T_3 = T_3' + T_3'' = \sqrt{1-m(1-m)} \cdot K\sin(\theta_{rel} - \Theta_3) \cdot T_S \quad (56)$$

where:
$\theta_3$—An angle depending on the factor m only, and $$\Theta_3 = \arctan\left(\frac{\sqrt{3}\,m}{2-m}\right) + k\pi \cdot k$$

is an integer and k=0, ±1, ±2, ±3, or . . . . Select k so that 0°≤$\Theta_3$≤60° for 0≤m≤1, e.g.: $\Theta_3$=0° when m=0. The zero vector time is $$T_0 = T_S - T_1 - T_2 - T_3 = [1 - \sqrt{3-m(3-m)} \cdot K\sin(\Theta_4 + \theta_{rel})] \cdot T_S \quad (57)$$

where:
$\Theta_4$—An angle depending on m only, and $$\Theta_4 = \arctan\left(\frac{\sqrt{3}\,(1-m)}{3-m}\right),$$

e.g.: $\Theta_4$=30° when m=0. Likewise, it can be found that the inverter DC link voltage utilization without over-modulation is the same as Equation (51). So the enhanced SVM has one maximum inverter DC link voltage utilization without overmodulation, which is $$\eta_{max} = \frac{1}{\sqrt{9-3m(3-m)}} \quad (58)$$

Figure 24:
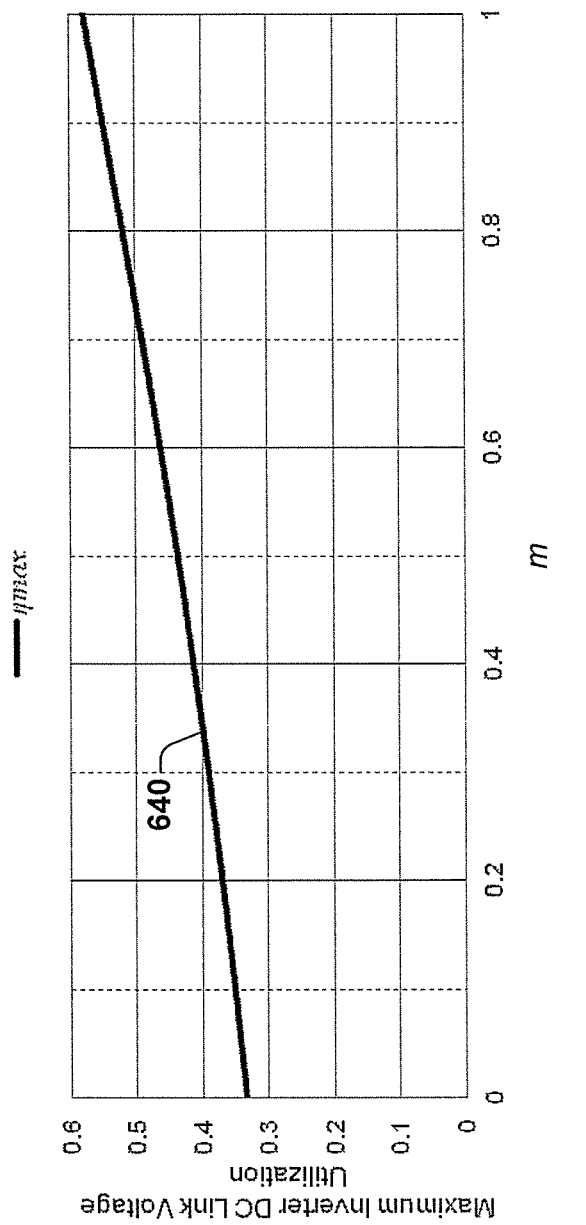
FIG. 24 is a graph illustrating a maximum inverter DC ling voltage utilization versus m for enhanced SVM in accordance with one embodiment of the disclosure.

Plot of Equation (58) is shown in FIG. 24 at 640. When m=1, the enhanced SVM becomes the existing SVM and $$\eta \leq \frac{1}{\sqrt{3}},$$

which has been stated in earlier Equation (7); when m=0, it becomes the special case of the enhanced SVM at m=0 and $$\eta \leq \frac{1}{3}$$

(to be discussed in greater detail below).

Figure 25A:
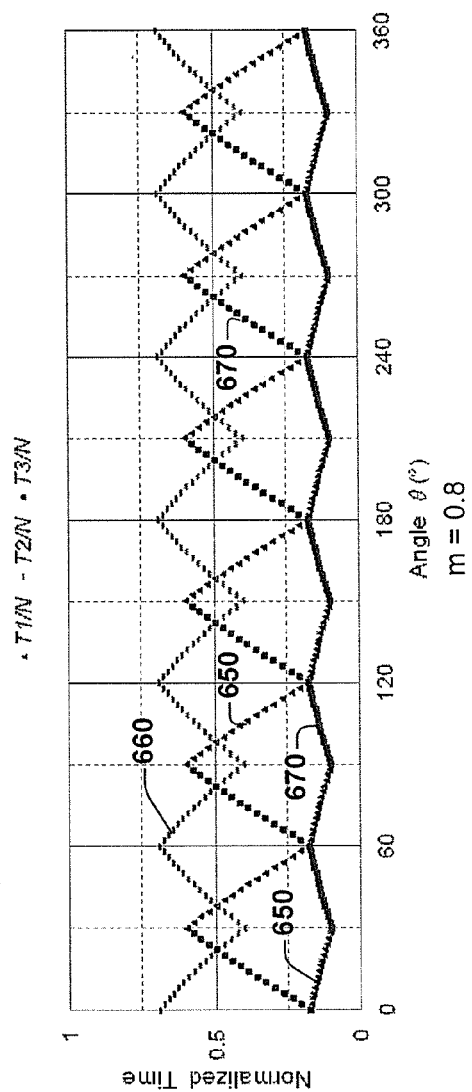
FIGS. 25A-25B are graphs illustrating normalized time versus reference angle plots for enhanced SVM at m=0.8 and m=0.2, respectively, according to one embodiment.
Figure 25B:
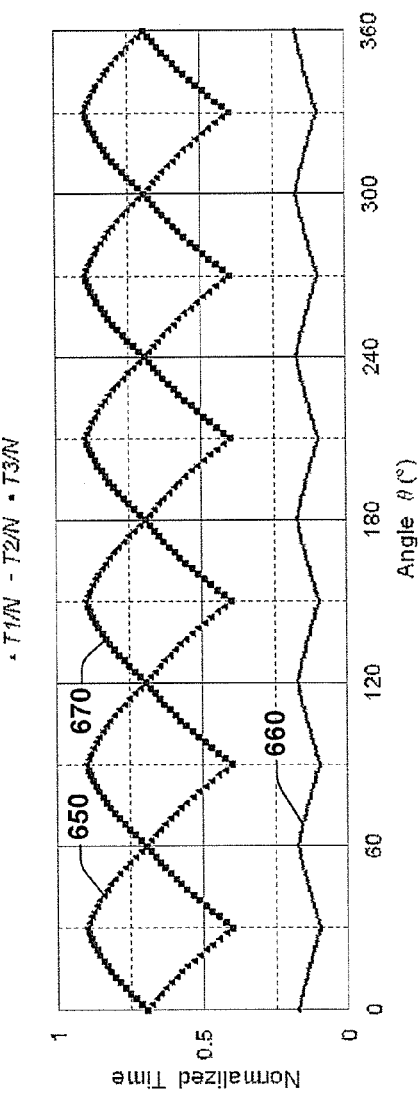

Plots of normalized time $T_1$ 650, $T_2$ 660, and $T_3$ 670 for the enhanced SVM are shown in FIGS. 25A and 25B with $\Theta_{Tr}$=30° for all the sectors, with m=0.8 and 0.2 as examples, respectively. It is obvious that $T_1$, $T_2$ and $T_3$ are all non-zero. Using single-shunt current sensing, at any time it is a good choice to measure inverter DC link current during two time intervals which is longer than the third time (e.g., $T_2$ and $T_3$ when 0°≤θ<30° as shown in FIG. 25A, $T_1$ and $T_3$ for all θ as shown in FIG. 25B). At $\Theta_{Tr}$=30°, it can be found that the minimum current sampling time, which is limited by $T_1$, $T_2$ or $T_3$, is $$T_{minimum} = \frac{\sqrt{3}(1-m)}{2}KT_S \quad (0.5 \leq m \leq 1) \quad (59)$$

or $$T_{minimum} = \frac{1-m}{2}KT_S \quad (0 \leq m \leq 0.5) \quad (60)$$

A user can choose the value of m based on the required maximum DC link voltage utilization, and the minimum time needed for the current sampling (i.e., make sure $T_{minimum} \geq T_{min}$, where $T_{min}$ is PWM dead time+driver delay+ADC sampling time).

Enhanced SVM at m=0: Similarly, the calculations of the enhanced SVM at m=0 are shown below:

$$T_1 = K \sin(120°-\theta_{rel}) \cdot T_S \quad (61)$$

$$T_3 = K \sin(\theta_{rel}) \cdot T_S \quad (62)$$

$$T_1 + T_3 = \sqrt{3} \cdot K \sin(30°+\theta_{rel}) \cdot T_S \quad (63)$$

$$T_0 = T_S - (T_1+T_3) = [1-\sqrt{3} \cdot K \sin(30°+\theta_{rel})]T_S \quad (64)$$

Figures 23A, 23B:
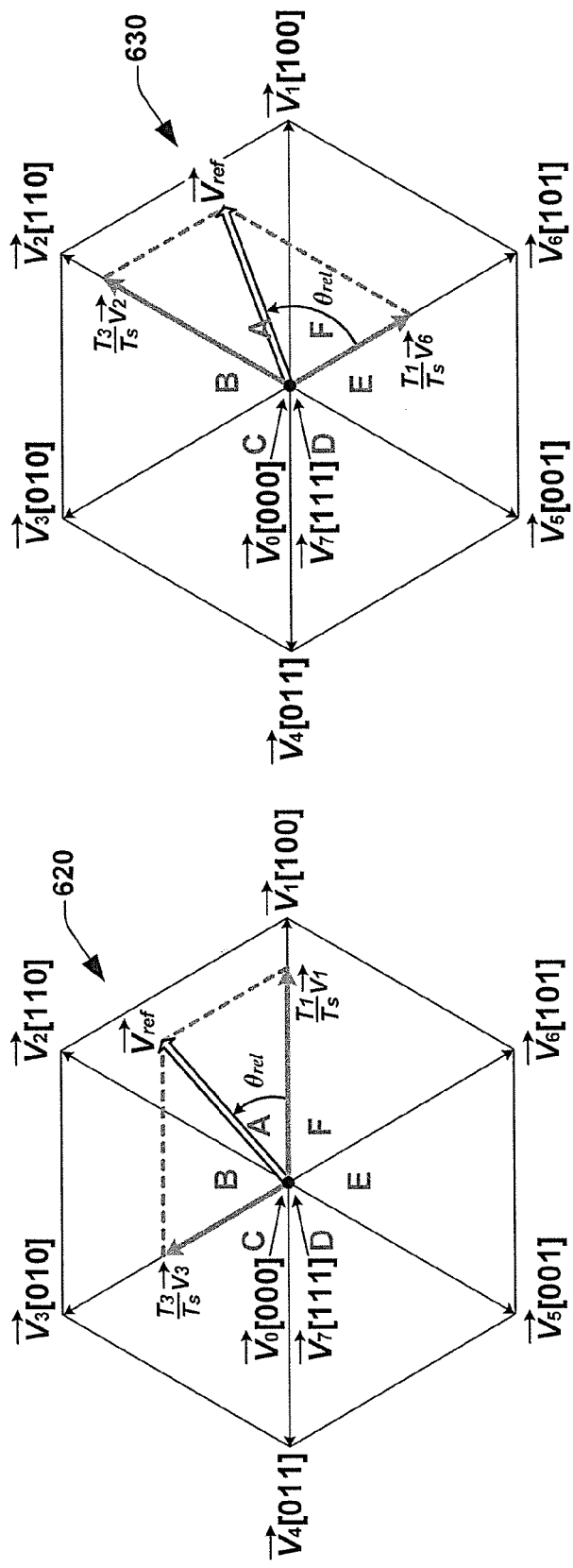
FIGS. 23A-23B are space vector hexagons illustrating a reference vector approximation employing enhanced SVM under the condition where m=0 such that the reference vector is approximated solely by non-adjacent active vectors in accordance with one embodiment.

Note that Equations (61) to (64) work for both FIGS. 23A and 23B. The inverter DC link voltage utilization without overmodulation becomes $$\eta = \frac{|V_{ref}|}{V_{DC}} \leq \frac{1}{3} \quad (65)$$

Figure 26:
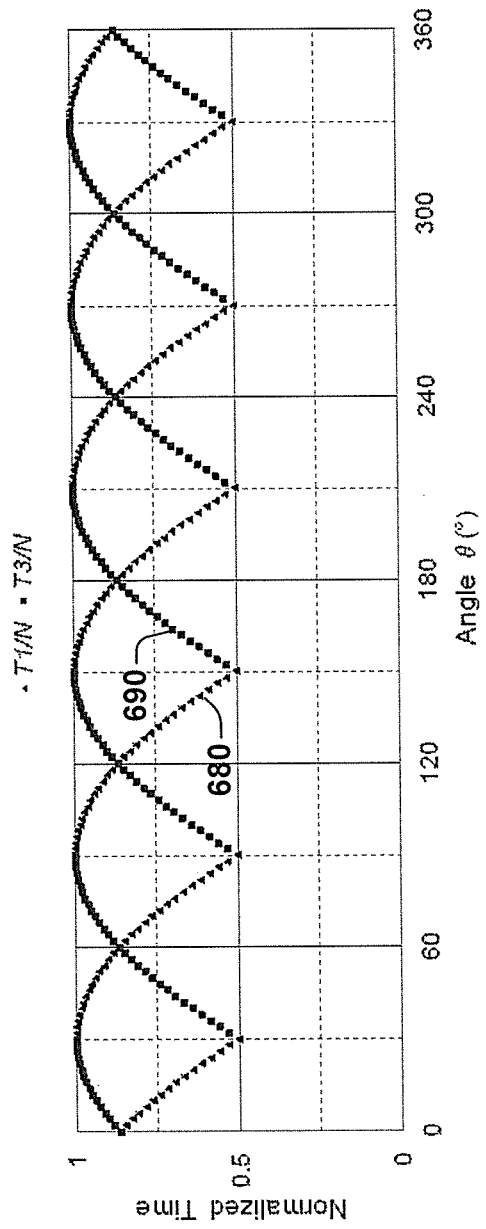
FIG. 26 is a graph illustrating a normalized time versus reference angle plot for enhanced SVM at m=0 according to one embodiment.

Plot of normalized time $T_1$ 680 and $T_3$ 690 with transition angle $\Theta_{Tr}$=30° for all the sectors is shown in FIG. 26. It is obvious that both $T_1$ and $T_3$ are non-zero. With $\Theta_{Tr}$=30° the shortest time for the current ADC sampling is $$T'_{minimum} = \frac{1}{2} \cdot KT_S \quad (66)$$

One advantageous element of the disclosure according to this embodiment is that instead of two adjacent active vectors being employed to synthesize a reference vector as in existing SVM, the enhanced SVM uses three adjacent active vectors or two non-adjacent active vectors for the approximation of reference vector $\vec{V}_{ref}$. In the new enhanced SVMs, non-zero intervals can be achieved for multiple current samplings within one PWM cycle, and the reconstruction of phase currents with single-shunt current sensing can be easily done without introducing distortion to the resulted motor phase current.

Figure 27A:
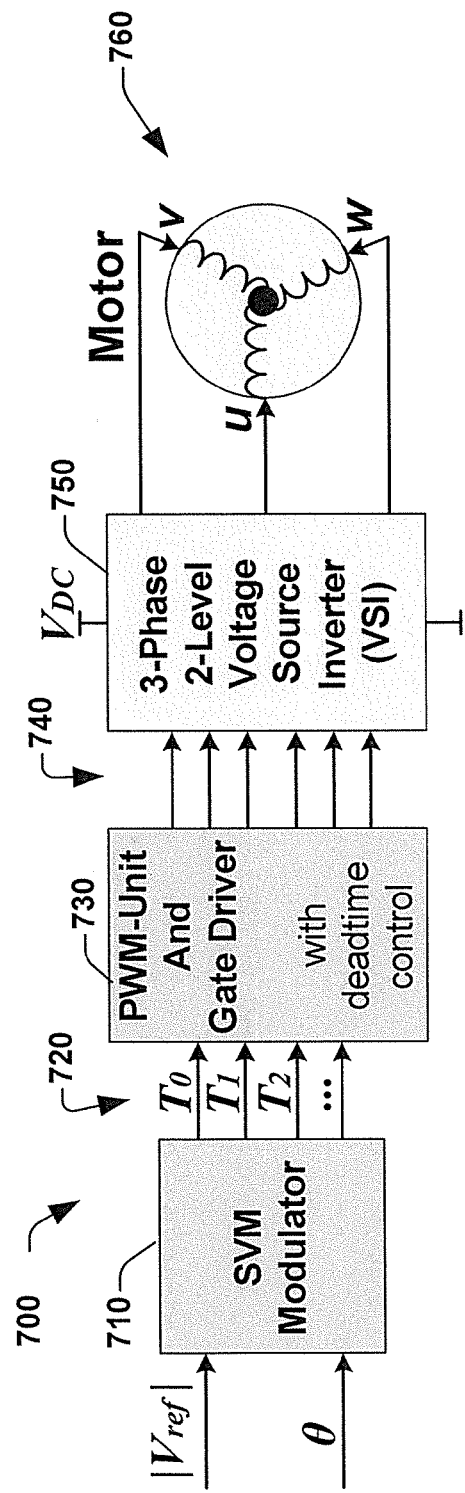
FIGS. 27A-27B are block diagrams illustrating a control system, such as a motor control system, that employs enhanced SVM that may include non-adjacent active vectors in approximating reference vectors according to one embodiment of the disclosure.
Figure 27B:
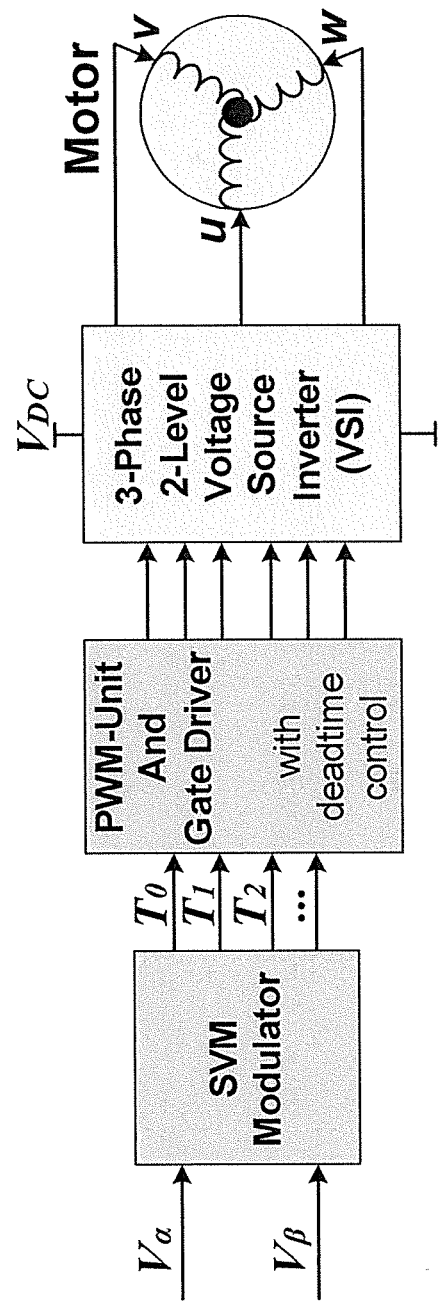

Usage of new SVM in motor control: The connections of SVM in a motor control system 700 are shown in FIGS. 27A and 27B. FIG. 27A shows a portion of a control system 700, for example, a motor control system. The control system 700 includes a space vector modulator (SVM) 710 according to the present disclosure that utilizes the enhanced SVM using three adjacent active vectors or two non-adjacent active vectors for synthesizing a reference vector. The enhanced SVM 710 receives a reference signal or reference samples and synthesizes one or more reference vectors based thereon, wherein at least one of the reference vectors employ either three adjacent active vectors or two non-adjacent active vectors as described herein. Based on the synthesized reference vector(s), the SVM modulator 710 outputs timing signals 720 to a PWM unit 730 that receives the timing signals 720 and generates PWM control signals 740. The PWM control signals 740 are provided to a three-phase inverter circuit 750 which generates output signals u, v, and w to drive a load 760 such as a three-phase motor.

The input to the new enhanced SVM can be the polar coordinates (i.e., radial coordinate $|V_{ref}|$ and angular coordinate θ) of the reference vector $\vec{V}_{ref}$ as shown in FIG. 27A, which has been discussed above. The inputs to the SVM can also be the Cartesian coordinates ($V_\alpha$, $V_\beta$) of the reference vector $V_{ref}$ in the α-β Cartesian coordinate system, as shown in FIG. 27B.

Figure 28:
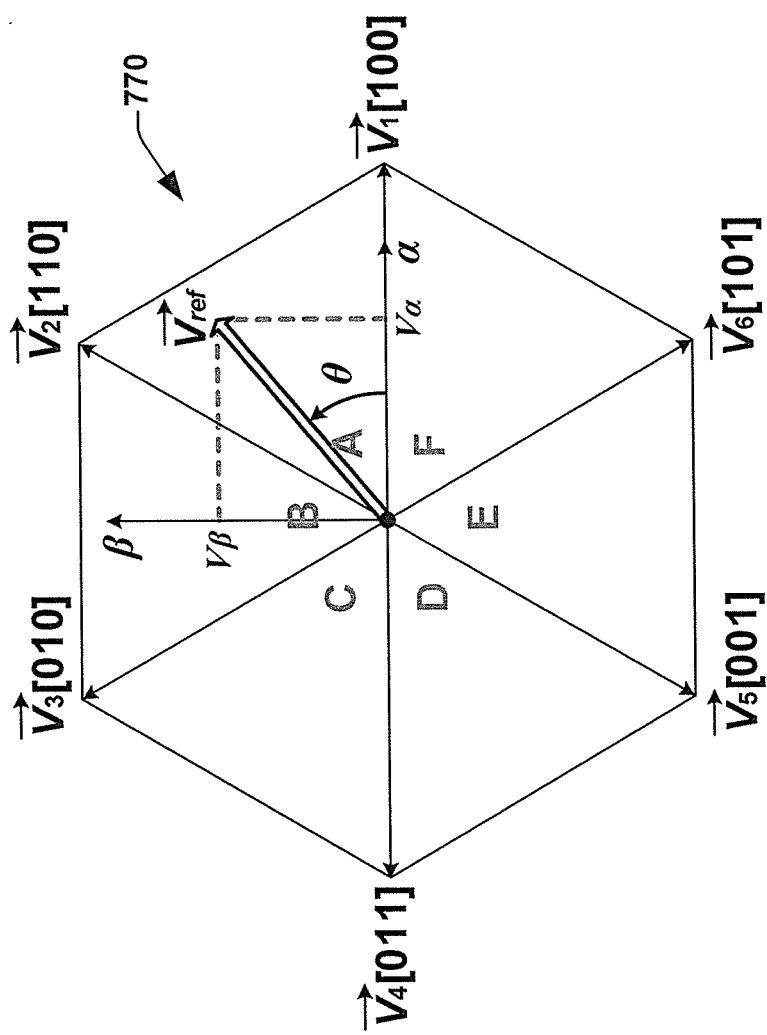
FIG. 28 is a space vector hexagon showing a reference vector in enhanced SVM in polar coordinates and Cartesian coordinates, respectively.

The coordinate systems in the SVM space vector hexagon are shown in FIG. 28 at 770. The Polar-to-Cartesian Transform is:

$$V_\alpha = |V_{ref}|\cos(\theta) \quad (67)$$

$$V_\beta = |V_{ref}|\sin(\theta) \quad (68)$$

With Equations (67) and (68), all the formulas listed in Table 4 can be transferred to format with inputs of $V_\alpha$ and $V_\beta$. For example, the time calculations of the enhanced SVM at m=0 in sector AB become $$T_1 = \frac{\sqrt{3}\,T_S}{2V_{DC}} \cdot (\sqrt{3}\,V_\alpha + V_\beta) \quad (69)$$

$$T_3 = \frac{\sqrt{3}\,T_S}{V_{DC}} \cdot V_\beta \quad (70)$$

$$T_0 = T_S - (T_1 + T_3) \quad (71)$$

Figure 29:
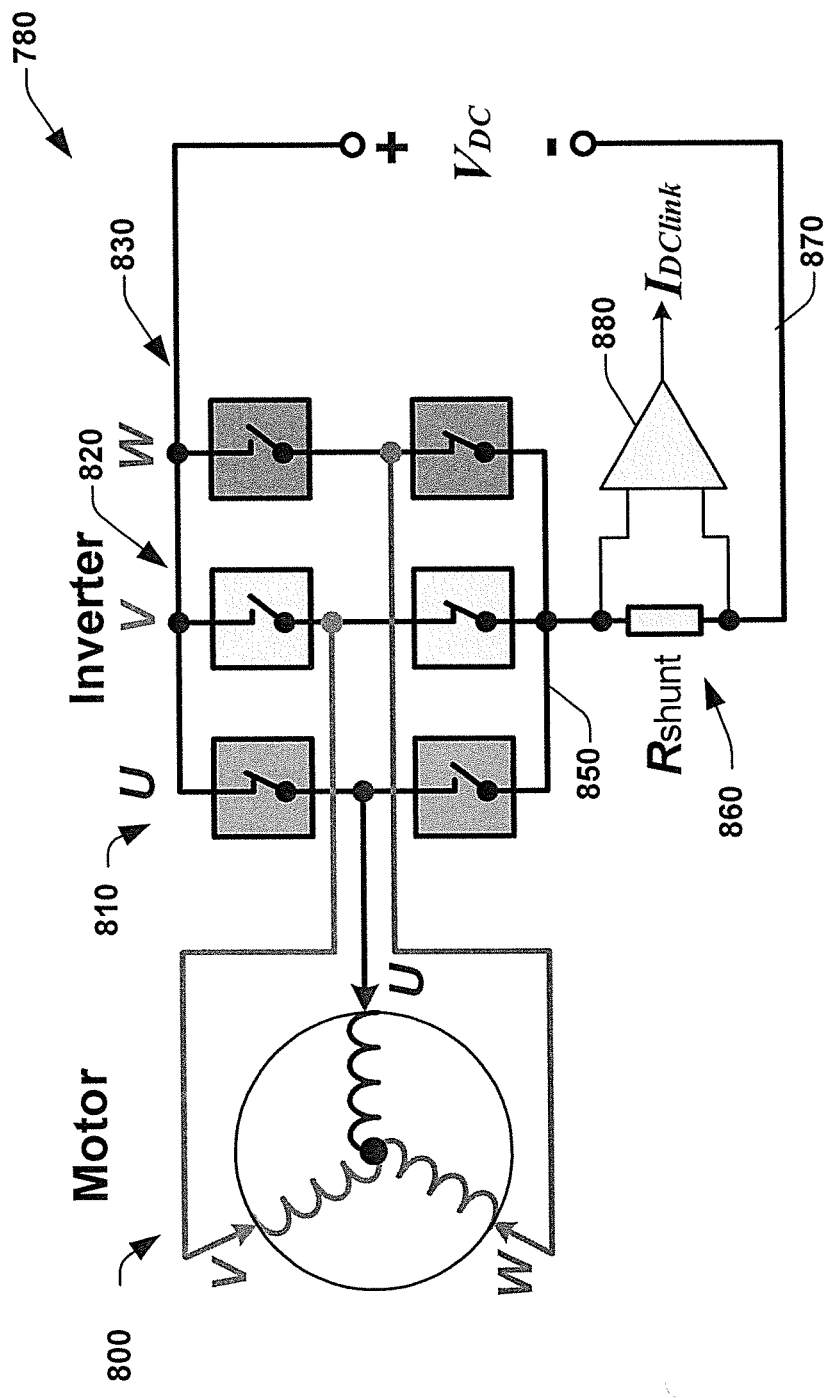
FIG. 29 is a block diagram illustrating a three phase inverter in a control system such as that illustrated in FIGS. 27A-27B that employs single-shunt current sensing according to one embodiment.

Inverter with single-shunt current sensing: The connection 780 of a three-phase two-level voltage source inverter 790 and a motor 800 are shown in FIG. 29. As illustrated, the inverter 790 comprises a first pair of series-connected switches 810, a second pair of series-connected switches 820, and a third pair of series-connected switches 830. Each of the series-connected pairs 810, 820, and 830 are connected at a node that forms an output u, v, w that connects to a respective phase of the load 800. Each of the series-connected pairs 810, 820, 830 also couple together at a terminal 850 that couples to a first terminal of a shunt resistor 860 that has a second terminal connected to a reference potential 870. An amplifier 880 has input terminals coupled to the first and second terminals of the shunt resistor 860, respectively, wherein an output of the amplifier 880 reflects a current conducting through the shunt resistor 860.

The six switching devices of the inverter, which could be MOSFET, IGBT or similar parts, are controlled by microcontroller PWM signals. The motor windings can be wired in star (as shown) or delta. The enhanced SVM discussed above using either three adjacent active vectors or two non-adjacent active vectors to synthesize the reference vector is used to control the PWM to create three-phase sinusoidal waveforms to the motor windings. The shunt resistor $R_{shunt}$ 860 is inserted into the inverter DC link to sense the DC link current. If needed, the amplifier 880 is used to amplify the resistor voltage drop which is proportional to the DC link current. Note that a Hall sensor, a current transformer, or other current sensors can replace the shunt resistor to sense the DC link current.

There are a lot of switching sequence combinations for the new enhanced SVMs, depending on different sequencings of active/zero vectors, splitting of the duty cycles of the vectors, and choice of existing zero vectors (i.e., to choose zero vector $\vec{V}_0$ [000], or $\vec{V}_7$ [111], or both). It is difficult to list all the switching sequences here. This section only gives some examples of the switching sequences, which can be easily implemented using Infineon microcontrollers, or other microcontrollers.

Figures 31A, 31B:
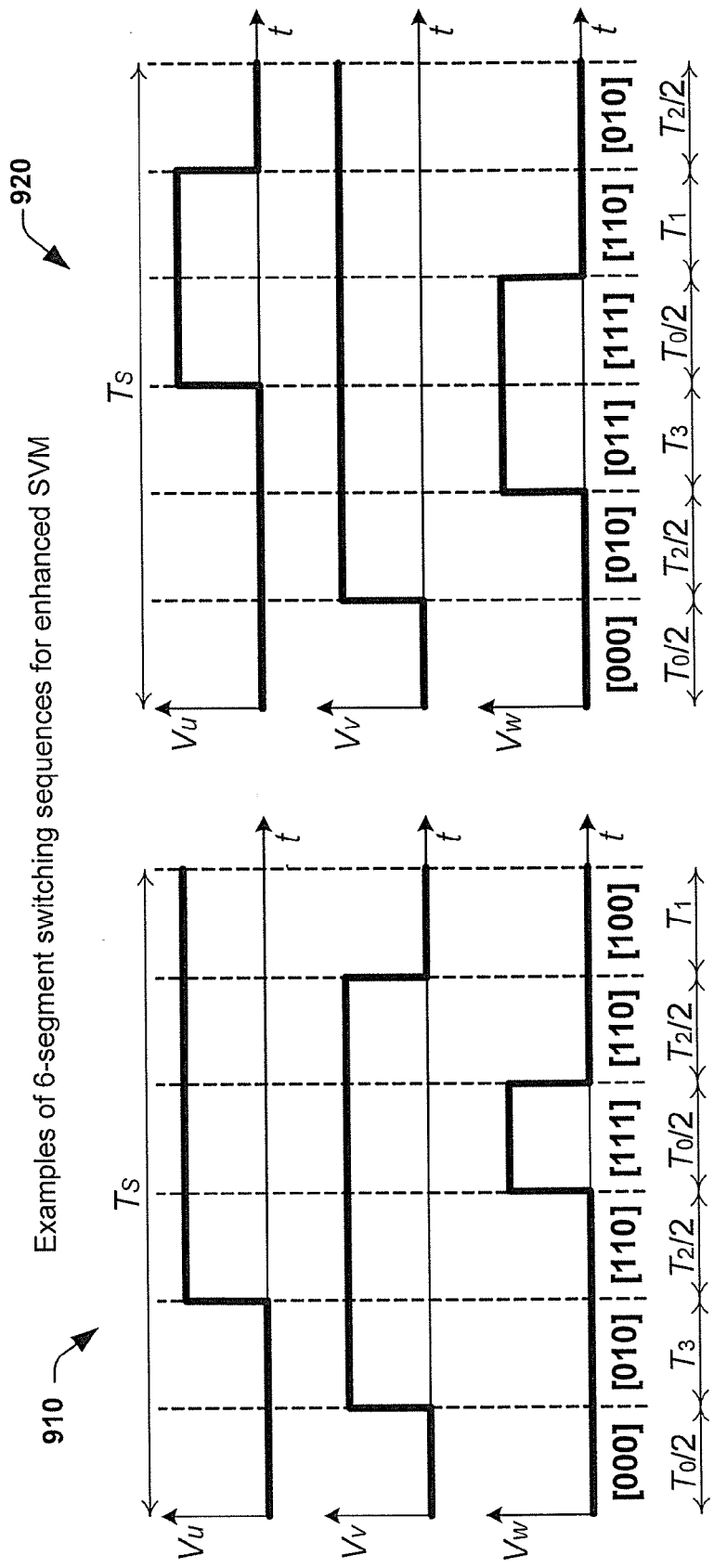
FIGS. 31A-31B illustrate examples of 6-segment switching sequences for enhanced SVM according to one embodiment.
Figures 32A, 32B:
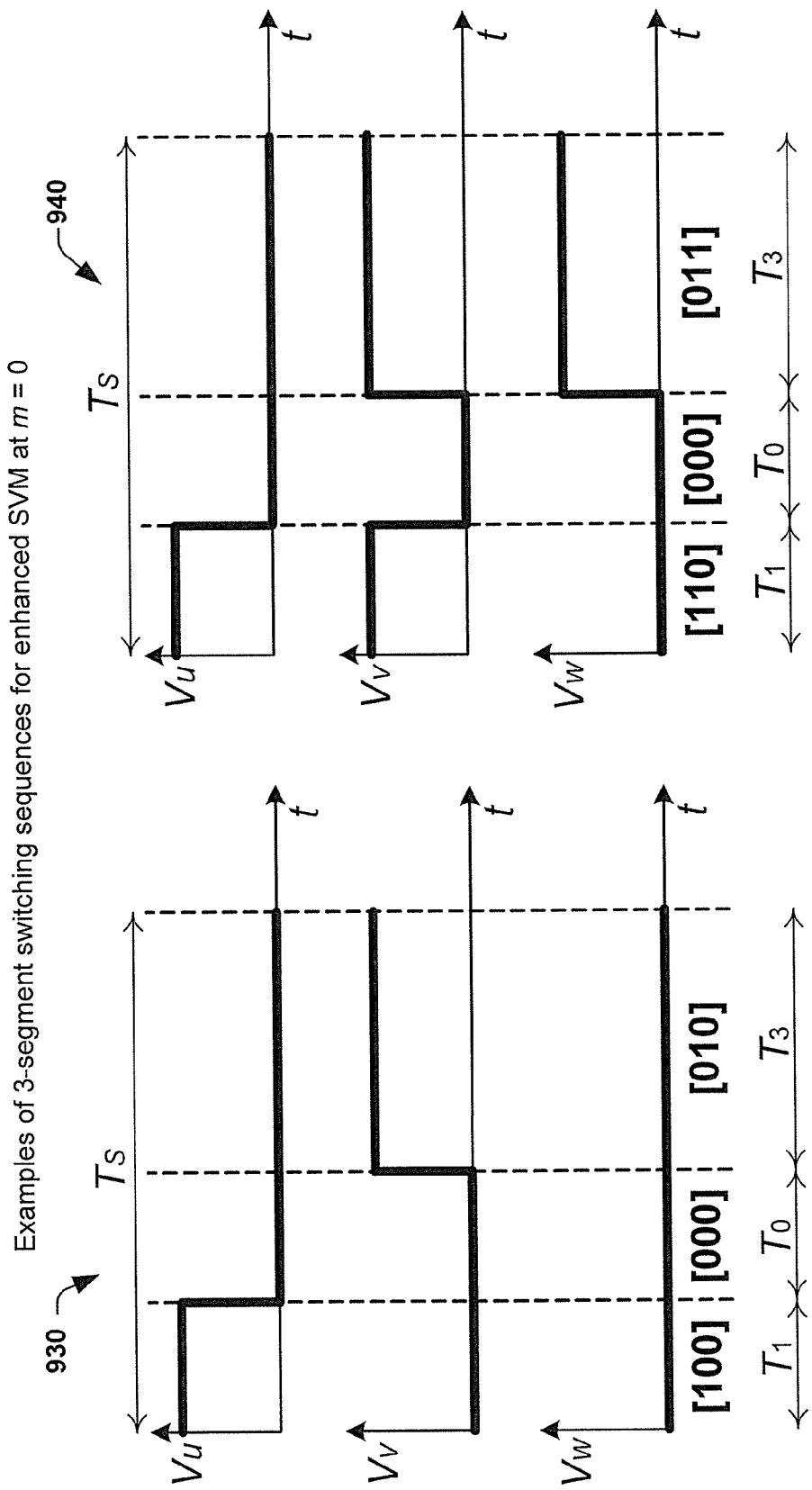
FIGS. 32A-32B illustrate examples of 3-segment switching sequences for enhanced SVM at m=0 according to one embodiment.
Figures 33A, 33B:
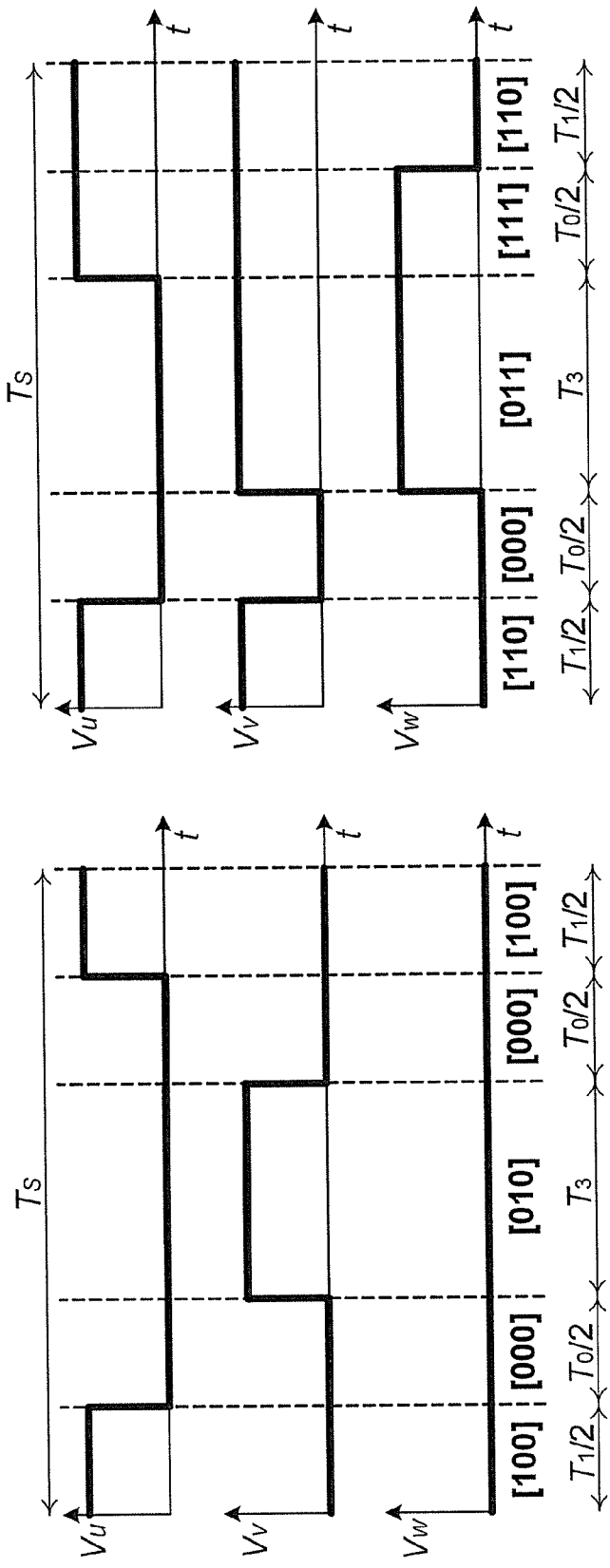
FIGS. 33A-33B illustrate examples of 5-segment switching sequences for enhanced SVM at m=0 according to one embodiment.

Switching sequence design for enhanced SVM: FIGS. 30A and 30B show examples of 4-segment switching sequences for the enhanced SVM at 890, 900, and FIGS. 31A and 31B show examples of 6-segment switching sequences at 910, 920. FIGS. 32A and 32B show examples of 3-segment switching sequences for the enhanced SVM at m=0 at 930, 940, and FIGS. 33A and 33B show examples of 5-segment switching sequences at m=0 at 950, 960.

Current reconstruction: two/three motor phase currents can be reconstructed by using single-shunt current sensing. In each PWM cycle, inverter DC link current is measured at least twice during two different active vector segments to get two motor phase currents. The ADC samplings are normally triggered near the center of the active vector segments to avoid current transitions.

Figure 34:
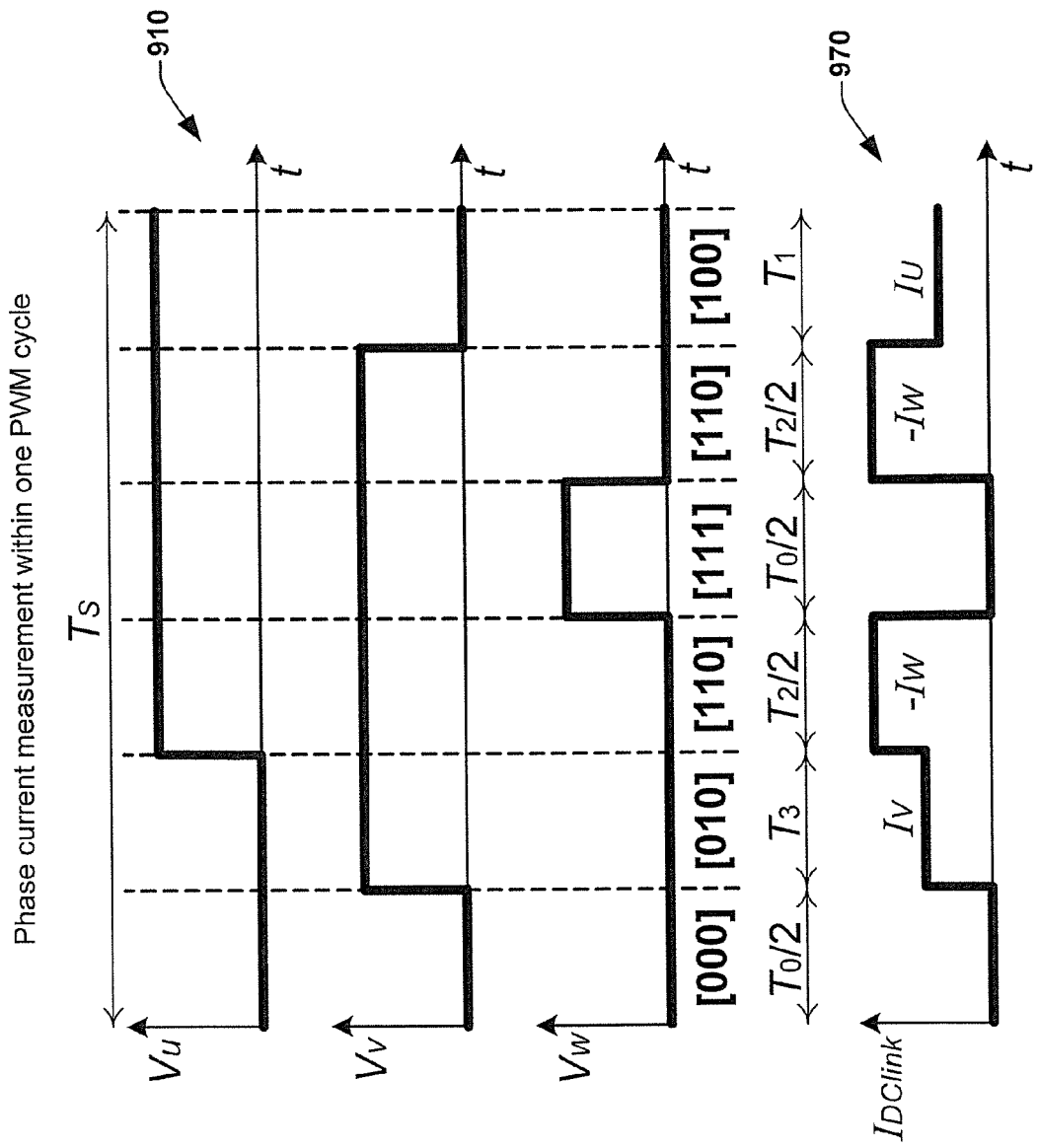
FIG. 34 illustrates the DC link current corresponding to the switching sequences shown in FIG. 31A.

Table 5 shows inverter DC link current of different PWM segments. As an example, FIG. 34 shows the DC link current $I_{DClink}$ 970 corresponding to the switching sequences 910 shown earlier in FIG. 31A for the enhanced SVM. Two phase currents can be measured at two PWM active vector segments which are more than or equal to $T_{min}$, e.g.: $I_{DClink}$=-$I_W$ during $T_2/2$ and $I_{DClink}$=$I_V$ during $T_3$ in FIG. 34 if $T_2/2 \geq T_{min}$ and $T_3 \geq T_{min}$. With two phase currents, the third motor phase current can be calculated easily because $I_U+I_V+I_W=0$.

It can be found from FIG. 34 that for the enhanced SVM, it is possible to take three ADC samplings of inverter DC link current within one PWM cycle to get three motor phase currents directly, if all the three active vector segments are longer than $T_{min}$. It will be useful for the application cases with $I_U+I_V+I_W \neq 0$. It is also possible to take only two ADC samplings of the interested motor phase current (e.g.: $I_U$ and $I_V$ only) directly within any PWM cycle.

TABLE 5

Inverter DC link current of different PWM segments

| PWM Segment | | Inverter DC link current $I_{DClink}$ Note 1 | Remark |
|---|---|---|---|
| Active Vectors | $\vec{V}_1$ [100] | $I_U$ | Take current sample for motor phase current |
| | $\vec{V}_2$ [110] | -$I_W$ | |
| | $\vec{V}_3$ [010] | $I_V$ | |
| | $\vec{V}_4$ [011] | -$I_U$ | |
| | $\vec{V}_5$ [001] | $I_W$ | |
| | $\vec{V}_6$ [101] | -$I_V$ | |
| Zero Vectors | $\vec{V}_0$ [000] | 0 | If needed, can be used for channel offset calibration |
| | $\vec{V}_7$ [111] | 0 | |

Note 1
$I_U$, $I_V$ and $I_W$ are the currents of motor phases U, V and W, respectively.

Figure 35A:
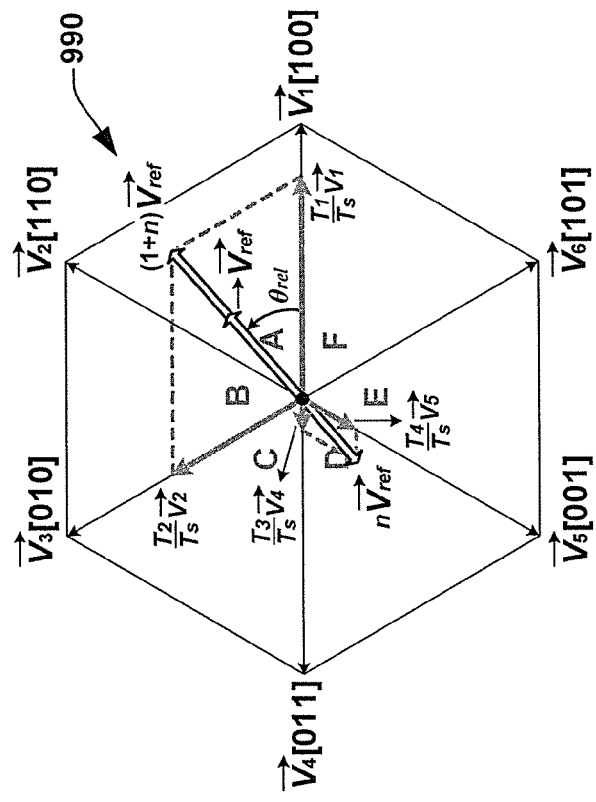
Figure 35B:
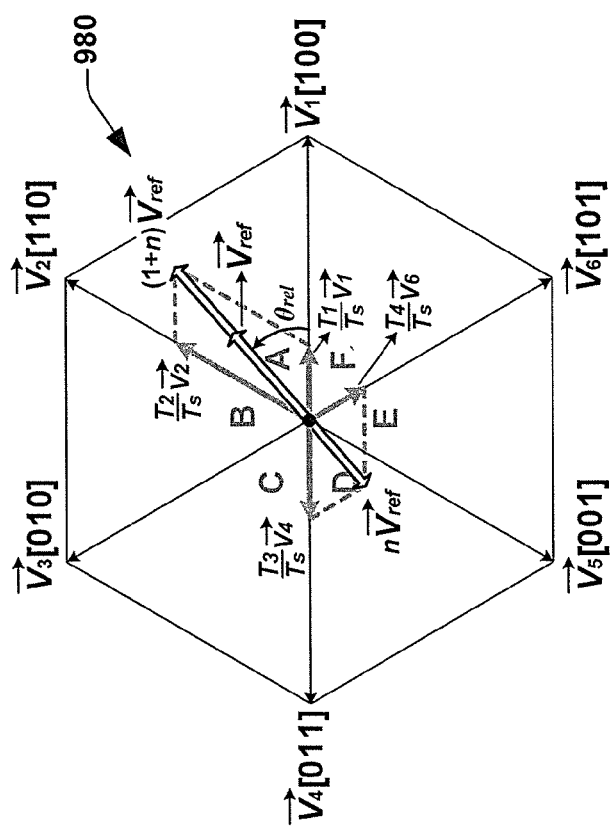

To solve the problem as mentioned above, it is possible to approximate the reference vector $\vec{V}_{ref}$ in alternative ways as shown in FIGS. 35A and 35B, where n≥0. Using reference vector in sector A as examples, in FIG. 35A at 980, $(1+n)\vec{V}_{ref}$ is approximated by two adjacent active vectors just like the existing SVM, and a reverse portion $n\vec{V}_{ref}$ is approximated by two non-adjacent and 120°-separated active vectors; in FIG. 35B at 990, $(1+n)\vec{V}_{ref}$ is approximated by two non-adjacent and 120°-separated active vectors, and a reverse portion $n\vec{V}_{ref}$ is approximated by two adjacent active vectors. The alternative solutions shown in FIGS. 35A and 35B use four active vectors to approximate the reference vector, while the solutions mentioned earlier use three or two. The approximation shown in FIG. 35A can be considered a special case of the enhanced SVM at m≥1, and the one shown in FIG. 35B can be considered a special case of the enhanced SVM at m≤0.

The exemplary embodiments described above represent only an illustration of the principles of the present invention. It is self-evident that modifications and variations of the arrangements and details described herein may be of interest to other specialists. The aim is therefore that the invention should be restricted only by the scope of protection of the following patent claims and not by the specific details, which have been presented herein on the basis of the description and the explanation of the exemplary embodiments.

What is claimed is:

1. A method of performing space vector modulation (SVM) for pulse width modulation (PWM) control for creating alternating current (AC) waveforms, comprising:

generating a reference signal and sampling the reference signal at a sampling frequency to generate a plurality of reference samples; and performing a reference vector approximation to synthesize a reference vector associated with at least one of the reference samples, wherein the reference vector approximation has a first portion that employs two adjacent active vectors and a remaining portion that employs two non-adjacent active vectors in the synthesis thereof.

2. The method of claim 1, wherein the two non-adjacent active vectors are separated by 120°.

3. A control system, comprising:

a space vector modulator configured to receive a plurality of reference signal samples and perform a reference vector approximation to synthesize a reference vector associated with at least one of the reference signal samples, wherein the reference vector approximation has at least one of a first portion that employs two or more adjacent active vectors and a remaining portion that employs two non-adjacent active vectors in the synthesis thereof, and wherein the space vector modulator outputs timing signals based on the reference vector approximation;

a pulse width modulation unit configured to receive the timing signals from the space vector modulator, and output pulse width modulation control signals based thereon; and a three phase inverter configured to receive the pulse width modulation control signals and generate alternating current waveforms based thereon.

4. The control system of claim 3, wherein the first portion of the reference vector approximation is zero, and the remaining portion constitutes the entire reference vector approximation.

5. The control system of claim 3, wherein the two non-adjacent active vectors are separated by 120°.

6. The control system of claim 3, wherein the remaining portion is zero, and the first portion constitutes the entire reference vector approximation.

7. A control system comprising:

a space vector modulator configured to receive a plurality of reference signal samples and perform a reference vector approximation to synthesize a reference vector associated with at least one of the reference signal samples, wherein the reference vector approximation has at least one of a first portion that employs two or more adjacent active vectors and a remaining portion that employs two non-adjacent active vectors in the synthesis thereof.

8. The control system of claim 7, wherein the first portion of the reference vector approximation is zero, and the remaining portion constitutes the entire reference vector approximation.

9. The control system of claim 7, wherein the remaining portion is zero, and the first portion constitutes the entire reference vector approximation.

10. The control system of claim 7, wherein the reference vector approximation employs four active vectors.

* * * * *